(12) United States Patent
Kashiwagi et al.

(10) Patent No.: US 9,417,455 B2
(45) Date of Patent: Aug. 16, 2016

(54) IMAGE DISPLAY DEVICE

(71) Applicant: KABUSHIKI KAISHA TOSHIBA, Tokyo (JP)

(72) Inventors: Masako Kashiwagi, Kanagawa (JP); Shinichi Uehara, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 33 days.

(21) Appl. No.: 14/604,907

(22) Filed: Jan. 26, 2015

(65) Prior Publication Data

US 2015/0219912 A1     Aug. 6, 2015

(30) Foreign Application Priority Data

Jan. 31, 2014     (JP) .................................. 2014-017890

(51) Int. Cl.
*G02F 1/1335* (2006.01)
*G02B 27/22* (2006.01)
*G02F 1/1343* (2006.01)
*G02F 1/29* (2006.01)

(52) U.S. Cl.
CPC ...... *G02B 27/2214* (2013.01); *G02F 1/134309* (2013.01); *G02F 1/29* (2013.01); *G02F 2001/294* (2013.01)

(58) Field of Classification Search
CPC ..................... G02B 27/2214; G02F 1/134309; G02F 1/29; G02F 2001/294; H04N 13/0404; H04N 13/0402
USPC ............................................................ 349/15
See application file for complete search history.

(56) References Cited

U.S. PATENT DOCUMENTS

2010/0259697 A1* 10/2010 Sakamoto .......... G02B 27/2214
                                                                 349/15

FOREIGN PATENT DOCUMENTS

JP     2010-249954     11/2010

* cited by examiner

Primary Examiner — Nathanael R Briggs
(74) Attorney, Agent, or Firm — Finnegan, Henderson, Farabow, Garrett & Dunner LLP

(57) ABSTRACT

According to one embodiment, an image display device includes a liquid crystal optical device and an image displayer. The liquid crystal optical device includes a plurality of first electrodes, a plurality of second electrodes, a liquid crystal layer provided between the first and second electrodes, and a first driver. The first driver forms a refractive index distribution in the liquid crystal layer. The image displayer includes a plurality of subpixels. Each of subpixels has a first length along a third direction and a second length along a fourth direction. A distance along the third direction between most proximal electrodes of the first electrodes is shorter than a distance along the fourth direction between most proximal electrodes of the second electrodes.

19 Claims, 17 Drawing Sheets

IMAGE DISPLAY DEVICE

CROSS-REFERENCE TO RELATED APPLICATIONS

This application is based upon and claims the benefit of priority from Japanese Patent Application No. 2014-017890, filed on Jan. 31, 2014; the entire contents of which are incorporated herein by reference.

FIELD

Embodiments described herein relate generally to an image display device.

BACKGROUND

A liquid crystal optical device is known in which the distribution of the refractive index is changed according to the application of a voltage by utilizing the birefringence of liquid crystal molecules. Also, there is a stereoscopic image display device in which such a liquid crystal optical device is combined with an image displayer.

By changing the distribution of the refractive index of the liquid crystal optical device, the stereoscopic image display device switches between a state in which the image displayed by the image displayer is caused to be incident on the eyes of a viewer as displayed by the image displayer and a state in which the image displayed by the image displayer is caused to be incident on the eyes of the viewer as multiple parallax images.

Thereby, a two-dimensional display operation and a three-dimensional image display operation are performed. In such an image display device, crosstalk may occur between the different parallax images. It is desirable to increase the display quality.

DETAILED DESCRIPTION

Figure 1:
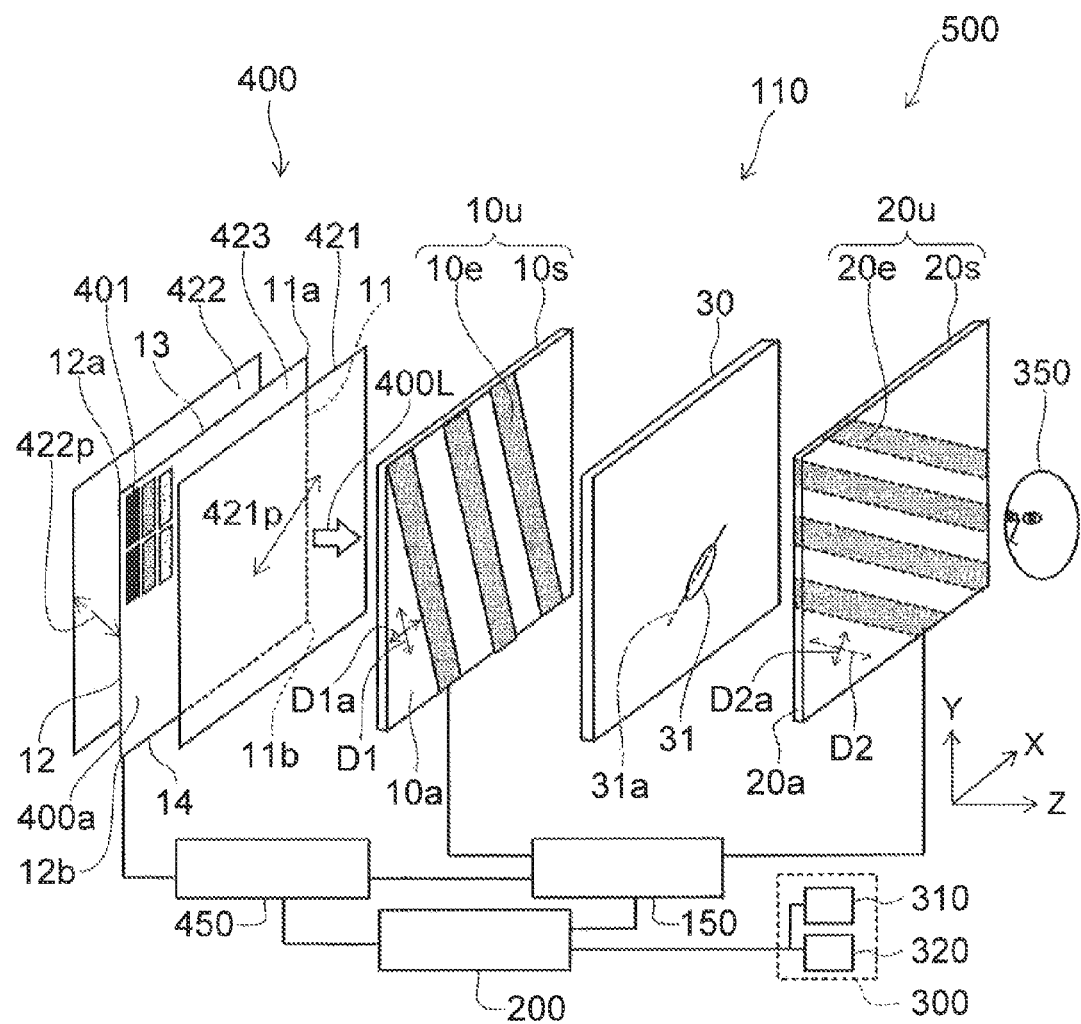
FIG. 1 is a schematic view illustrating an image display device according to a first embodiment.

According to one embodiment, an image display device includes a liquid crystal optical device and image displayer. The liquid crystal optical device includes a plurality of first electrodes extending in a first direction in a plane, a plurality of second electrodes extending in a second direction in the plane, the second direction being different from the first direction, a liquid crystal layer provided between the first electrodes and the second electrodes; and a first driver electrically connected to the first electrodes and the second electrodes. The first driver implements forming a first refractive index distribution in the liquid crystal layer along a first perpendicular direction by setting the first electrodes to a first potential, the first perpendicular direction being parallel to the plane and perpendicular to the first direction, and forming a second refractive index distribution in the liquid crystal layer along a second perpendicular direction by setting the second electrodes to a second potential, the second perpendicular direction being parallel to the plane and perpendicular to the second direction. The image displayer includes a plurality of subpixels. Light from the subpixels is incident on the liquid crystal layer. The light includes image information. Each of the subpixels has a first length along a third direction and a second length along a fourth direction when projected onto the plane. Tee third direction is parallel to the plane and different from the first direction and the second direction. The fourth direction is parallel to the plane and perpendicular to the third direction. The first length is shorter than the second length. Most proximal electrodes of the first electrodes include a first most proximal electrode and a second most proximal electrode. Most proximal electrodes of the second electrodes include a third most proximal electrode and a fourth most proximal electrode. A first distance along the third direction between a first center in the first perpendicular direction of the first most proximal electrode and a second center in the first perpendicular direction of the second most proximal electrode is shorter than a second distance along the fourth direction between a third center in the second perpendicular direction of the third most proximal electrode and a fourth center in the second perpendicular direction of the fourth most proximal electrode.

According to one embodiment, an image display device includes a liquid crystal optical device and an image displayer. The liquid crystal optical device includes: a plurality of first electrodes extending in a first direction in a plane, the first electrodes including a first group of electrodes and a second group of electrodes, the first group of electrodes being selected in a first period, the second group of electrodes being selected in a second period different from the first period, an opposing electrode, a liquid crystal layer provided between the first electrodes and the second electrodes, and a first driver electrically connected to the first electrodes and the opposing electrode. The first driver implements forming a first refractive index distribution in the liquid crystal layer along a first perpendicular direction by setting the first group of electrodes to a first potential, the first perpendicular direction being parallel to the plane and perpendicular to the first direction, and forming a second refractive index distribution along the first perpendicular direction by setting the second group of electrodes to a second potential. The image displayer includes a plurality of subpixels. Light from the subpixels is incident on the liquid crystal layer. The light includes image information. Each of the subpixels has a first length along a third direction and a second length along a fourth direction when projected onto the first surface. The third direction is parallel to the plane and different from the first direction. The fourth direction is parallel to the plane and perpendicular to the third direction. The first length is shorter than the second length. The first period is longer than the second period.

Various embodiments will be described hereinafter with reference to the accompanying drawings.

The drawings are schematic or conceptual; and the relationships between the thicknesses and widths of portions, the proportions of sizes between portions, etc., are not necessarily the same as the actual values thereof. Further, the dimensions and/or the proportions may be illustrated differently between the drawings, even for identical portions.

In the drawings and the specification of the application, components similar to those described in regard to a drawing thereinabove are marked with like reference numerals, and a detailed description is omitted as appropriate.

First Embodiment

FIG. 1 is a schematic view illustrating an image display device according to a first embodiment.

As shown in FIG. 1, the image display device 500 includes a liquid crystal optical device 110 and an image displayer 400.

The liquid crystal optical device 110 includes a first substrate unit 10u, a second substrate unit 20u, a liquid crystal layer 30, and a driver 150 (a first driver). In the example, the image display device 500 further includes a controller 200, a second driver 450, and a sensor 300.

The first substrate unit 10u includes a first substrate 10s and multiple first electrodes 10e. The first substrate 10s is light-transmissive. The first substrate 10s has a first surface 10a. For example, the first surface 10a is a major surface of the first substrate 10s.

A direction perpendicular to the first surface 10a is taken as a Z-axis direction. One direction perpendicular to the Z-axis direction is taken as an X-axis direction. A direction perpendicular to the Z-axis direction and the X-axis direction is taken as a Y-axis direction. The first surface 10a is parallel to the X-Y plane.

The multiple first electrodes 10e are provided on the first surface 10a. Each of the multiple first electrodes 10e extends in a first direction D1. The multiple first electrodes 10e are separated from each other in a direction intersecting (e.g., orthogonal to) the first direction D1. The first electrodes 10e have band configurations extending in the first direction D1. For example, the first direction D1 is parallel to the X-Y plane.

The second substrate unit 20u includes a second substrate 20s and multiple second electrodes 20e. The second substrate 20s is light-transmissive. The second substrate 20s has a second surface 20a. The second surface 20a opposes the first surface 10a.

In the specification, the state of being opposed includes the state of directly facing each other and the state of facing each other with another component inserted therebetween.

The second surface 20a is substantially parallel to the first surface 10a. The multiple second electrodes 20e are provided on the second surface 20a. Each of the multiple second electrodes 20e extends in a second direction D2. The multiple second electrodes 20e are separated from each other in a direction intersecting (e.g., orthogonal to) the second direction D2. The second direction D2 Intersects the first direction D1. In other words, the second direction D2 is non-parallel to the first direction D1. In the example, the second direction D2 Is tilted with respect to the first direction D1. The second direction D2 Is parallel to the X-Y plane.

The liquid crystal layer 30 is provided between the first substrate unit 10u and the second substrate unit 20u. The liquid crystal layer 30 includes liquid crystal molecules 31. The liquid crystal layer 30 includes, for example, a nematic liquid crystal. The liquid crystal layer 30 may include a chiral agent. The liquid crystal molecules 31 have a long-axis direction 31a.

The first substrate 10s and the second substrate 20s include, for example, transparent glass, a transparent resin, etc. The first electrodes 10e and the second electrodes 20e include, for example, an oxide including at least one element selected from the group consisting of In, Sn, Zn, and Ti. The first electrodes 10e and the second electrodes 20e include, for example, ITO (Indium Tin Oxide), etc. The first electrodes 10e and the second electrodes 20e may include, for example, a thin metal layer that is light-transmissive.

Such a liquid crystal optical device 110 is stacked with the image displayer 400 in the image display device 500. In other words, the image displayer 400 is stacked with the liquid crystal optical device 110. For example, the image displayer 400 has a display surface 400a. The display surface 400a includes multiple subpixels 401. The liquid crystal optical device 110 is stacked with the subpixels 401 of the image displayer 400.

In the example, the planar configuration of the display surface 400a is substantially a rectangle (including a square). The display surface 400a has first to fourth sides 11 to 14. For example, the first side 11 is parallel to the Y-axis direction.

The first side 11 extends in the Y-axis direction when projected onto a plane (the X-Y plane) parallel to the first surface 10a. The first side 11 has one end 11a and one other end 11b. The one other end 11b is separated from the one end 11a in the Y-axis direction.

The second side 12 is separated from the first side 11 in the X-axis direction and extends in the Y-axis direction. The second side 12 has one end 12a and one other end 12b. The one other end 12b is separated from the one end 12a in the Y-axis direction.

The third side 13 connects the one end 11a of the first side 11 and the one end 12a of the second side 12. The third side 13 extends in the X-axis direction.

The fourth side 14 connects the one other end 11b of the first side 11 and the one other end 12b of the second side 12. The fourth side 14 extends in the X-axis direction. The fourth side 14 is separated from the third side 13 in the Y-axis direction.

In the embodiment, the corner portions where the sides are connected may be tilted with respect to the sides. The corner portions may have curved configurations. In the embodiment, the configuration of the display surface 400a may be a rectangle (including a square) or any polygon. The display surface 400a has at least the first side 11 extending in the Y-axis direction.

In the specification of the application, the state of being stacked includes the state of directly overlapping and the state of overlapping with another component inserted therebetween.

Figure 2:
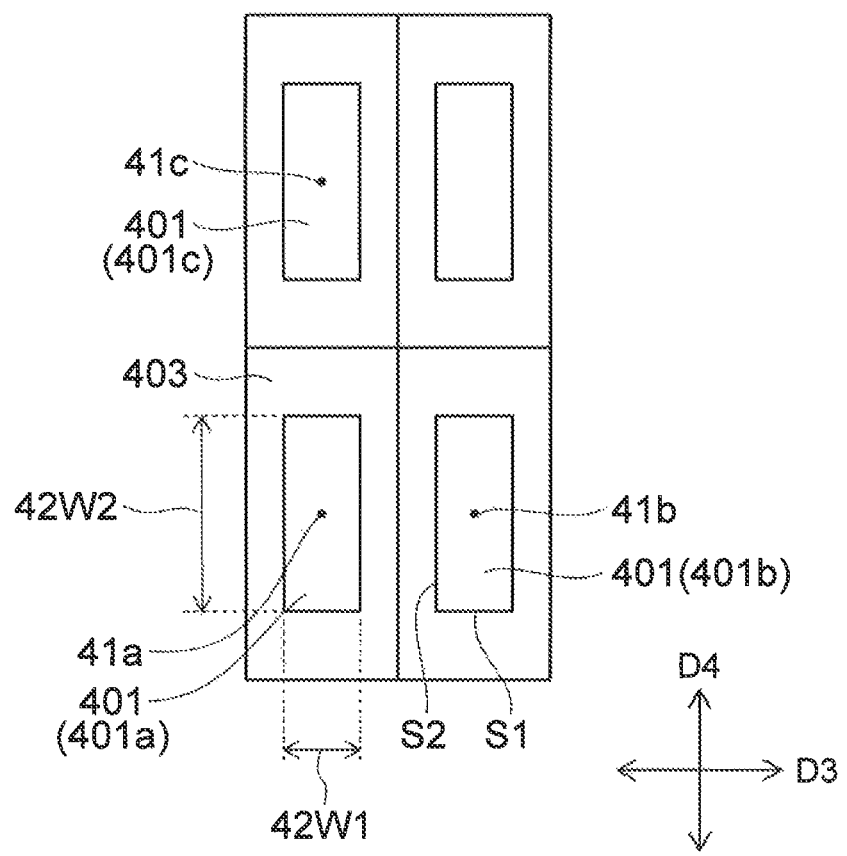
FIG. 2 is a schematic view illustrating the image display device according to the first embodiment.

FIG. 2 is a schematic view illustrating the image display device according to the first embodiment.

FIG. 2 shows the subpixels 401. As shown in FIG. 2, the subpixels 401 are, for example, rectangles. The subpixel 401 has, for example, a first length 42W1 (a first opening width) along a third direction D3 when projected onto the first surface 10a. The subpixel 401 has a second length 42W2 (a second opening width) along a fourth direction D4 perpendicular to the third direction when projected onto the first surface 10a. The first length 42W1 is shorter than the second length 42W2. For example, the subpixel 401 has a first side S1 that extends along the third direction D3 and a second side S2 that extends along the fourth direction D4. The third direction D3 and the fourth direction D4 are substantially parallel to the X-Y plane. The third direction D3 is a direction different from the first direction D1 and the second direction D2. For example, the third direction D3 is parallel to the X-axis direction. For example, the fourth direction D4 is parallel to the Y-axis direction. For example, the first side 11 and the second side 12 are parallel to the fourth direction D4. The third side 13 and the fourth side 14 are parallel to the third direction D3. The second side 12 is separated from the first side 11 in the third direction D3. The fourth side 14 is separated from the third side 13 in the fourth direction D4. The first direction D1 and the second direction D2 are parallel to the X-Y plane.

For example, the image displayer 400 includes a light-shielding unit 403 (a black matrix). The light-shielding unit 403 is adjacent to the subpixels 401 in the X-Y plane. For example, the light-shielding unit 403 is provided around the subpixels 401 in the X-Y plane. For example, signal lines and TFTs (Thin Film Transistors) are provided in the light-shielding unit 403. The configurations of the subpixels 401 may not be rectangles. For example, parallelograms may be used.

For example, the multiple subpixels 401 are disposed in an array configuration in the X-Y plane. The multiple subpixels 401 include, for example, a first adjacent pixel 401a, a second adjacent pixel 401b, and a third adjacent pixel 401c. The second adjacent pixel 401b is adjacent to the first adjacent pixel 401a in the third direction D3. The third adjacent pixel 401c is adjacent to the first adjacent pixel 401a in the fourth direction D4. The first adjacent pixel 401a projected onto the first surface 10a has a first centroid 41a. The second adjacent pixel 401b projected onto the first surface 10a has a second centroid 41b. The third adjacent pixel 401c projected onto the first surface 10a has a third centroid 41c.

The distance between the first centroid 41a and the second centroid 41b is shorter than the distance between the first centroid 41a and the third centroid 41c. In the arrangement of the multiple subpixels 401, the array pitch in the third direction D3 is smaller than the array pitch in the fourth direction D4.

The subpixel 401 extends in a direction parallel to the X-Y plane. The image displayer 400 includes a display layer 423. For example, a liquid crystal display device is used as the image displayer 400 in the example. In such a case, a liquid crystal layer is used as the display layer 423. For example, the image displayer 400 further includes a first polarizing layer 421 and a second polarizing layer 422. The display layer 423 is provided between the first polarizing layer 421 and the second polarizing layer 422. The first polarizing layer 421 and the second polarizing layer 422 include, for example, polarizing plates, polarizing films, polarizing filters, etc. The first polarizing layer 421 has a first transmission axis 421p.

The first transmission axis 421p is an axis perpendicular to the absorption axis of the first polarizing layer 421 (the extension direction of the first polarizing layer 421). The second polarizing layer 422 has a second transmission axis 422p. The second transmission axis 422p is an axis perpendicular to the absorption axis of the second polarizing layer 422 (the extension direction of the second polarizing layer 422).

In the example, the display layer 423 is disposed between the second polarizing layer 422 and the liquid crystal optical device 110; and the first polarizing layer 421 is disposed between the display layer 423 and the liquid crystal optical device 110. The light (image light 400L) that is emitted from the image displayer 400 is incident on the liquid crystal optical device 110 from the first polarizing layer 421. The image displayer 400 causes the light including the image information from the multiple subpixels 401 to be incident on the liquid crystal layer 30. The polarizing axis of the image light 400L that is emitted from the image displayer 400 is substantially parallel to the first transmission axis 421p of the first polarizing layer 421.

For example, the image light 400L is substantially linearly polarized light. The component of the image light 400L in the vibration plane (the vibration plane of the electric field) along the polarizing axis is larger than the component of the image light 400L in the vibration plane (the vibration plane of the electric field) along an axis orthogonal to the polarizing axis.

The configuration of the image displayer 400 is arbitrary. For example, any configuration such as a VA mode, a TN mode, an IPS mode, etc., is applicable to the display layer 423. A phase difference layer (a phase difference plate) may be provided between the first polarizing layer 421 and the display layer 423 and/or between the second polarizing layer 422 and the display layer 423.

In the example, the operation of the display layer 423 is controlled by the second driver 450 for the image displayer 400. The second driver 450 is connected to the display layer 423 that forms the light including the image information. For example, an image signal is input to the second driver 450 by a recording medium, an external input, etc. The second driver 450 controls the operation of the image displayer 400 based on the image signal that is input. Multiple pixels (not shown) are provided in the display layer 423. The image is formed by controlling the alignment of the liquid crystal for the multiple pixels and modulating the intensity of the light emitted from the multiple pixels. The light (the image light 400L) that includes the image is incident on the liquid crystal optical device 110.

The driver 150 is electrically connected to the multiple first electrodes 10e and the multiple second electrodes 20e. The alignment of the liquid crystal of the liquid crystal layer 30 changes according to the potential difference set between the first electrodes 10e and the second electrodes 20e. As described below, multiple lenses that extend in the X-Y plane are formed in the liquid crystal layer 30.

In the embodiment, an optical opening is formed between the first substrate 10s and the second substrate 20s. In the example, the optical opening is the multiple lenses formed in the liquid crystal layer 30.

For example, the refractive index distribution (the change of the refractive index) is formed in a direction orthogonal to the first direction D1 which is the extension direction of the first electrodes 10e due to a voltage supplied from the first driver 150. In other words, for example, in the first state, lenses having multiple band configurations (e.g., lenses having cylindrical configurations) are formed along the first direction D1. Or, a refractive index distribution is formed in a direction orthogonal to the second direction D2 which is the extension direction of the second electrodes 20e. In other words, in the second state, lenses having multiple band configurations (e.g., lenses having cylindrical configurations) are formed along the second direction D2. The second direction D2 intersects the first direction D1. Multiple refractive index distributions that extend in mutually-different multiple directions can be formed by changing the voltage state.

The driver 150 sets the voltage between the multiple first electrodes 10e and the multiple second electrodes 20e to the first state. The driver 150 is capable of implementing a first operation of forming a refractive index distribution (the first refractive index distribution) in the liquid crystal layer 30 along a direction (a first perpendicular direction D1a) parallel to the first surface 10a and perpendicular to the first direction D1 by setting the potential of the multiple first electrodes to the first potential.

The driver 150 sets the voltage between the multiple first electrodes 10e and the multiple second electrodes 20e to the second state. The driver 150 is capable of implementing a second operation of forming a refractive index distribution (the second refractive index distribution) in the liquid crystal layer 30 along a direction (a second perpendicular direction D2a) parallel to the first surface 10a and perpendicular to the second direction D2 by setting the potential of the multiple second electrodes to the second potential.

In the state (the first state) of the first operation, the driver 150 sets each of the first electrodes 10e to, for example, a first potential V1. In other words, in the state of the first operation, the electrodes of which the potential is set to the first potential V1 are the first electrodes 10e.

In the state (the second state) of the second operation, the driver 150 sets each of the second electrodes 20e to, for example, a second potential V2. In other words, in the state of the second operation, the electrodes of which the potential is set to the second potential V2 are the second electrodes 20e.

In the example, the first refractive index distribution corresponds to the first optical opening. The second refractive index distribution corresponds to the second optical opening.

As shown in FIG. 1, the second driver 450 and the driver 150 may be included in the controller 200 or may be combined in a single body.

The light (the image light 400L) including the image emitted from the image displayer 400 is incident on the liquid crystal optical device 110; and, for example, a three-dimensional image display operation of stereoscopic viewing is performed by the refractive index distribution of the liquid crystal optical device 110 recited above. The operation is described below. The sensor 300 also is described below.

The liquid crystal layer 30 is provided between the first substrate unit 10u and the second substrate unit 20u. For example, the liquid crystal molecules 31 are aligned in a prescribed direction in the liquid crystal layer 30. For example, a not-shown alignment film is provided on the surface (e.g., the surface of the first electrodes 10e) of the first substrate unit 10u opposing the liquid crystal layer 30. On the other hand, a not-shown alignment film is provided on the surface (e.g., the surface of the second electrodes 20e) of the second substrate unit 20u opposing the liquid crystal layer 30. Alignment processing (e.g., rubbing, etc.) of these alignment films is performed. Thereby, the alignment of the liquid crystal molecules 31 of the liquid crystal layer 30 is set.

A fifth direction D5 is the direction of the long-axis direction 31a (the direction of the director) of the liquid crystal molecules 31 of the liquid crystal layer 30 projected onto the X-Y plane.

The liquid crystal layer 30 includes, for example, a nematic liquid crystal. The dielectric anisotropy of the liquid crystal included in the liquid crystal layer 30 is, for example, positive. The state in which a voltage is not applied to the liquid crystal layer 30 (or, in the case where the liquid crystal layer 30 has a threshold voltage, the state in which a voltage that is not more than the threshold voltage is applied) is a non-activated state. The state in which a voltage (a voltage larger than the threshold voltage) is applied to the liquid crystal layer 30 is an activated state. For example, in the non-activated state, the liquid crystal layer 30 has a substantially horizontal alignment. In this state, the direction of the long-axis direction 31a of the liquid crystal molecules 31 projected onto the X-Y plane corresponds to the fifth direction D5. In the case where the dielectric anisotropy of the liquid crystal included in the liquid crystal layer 30 is positive, the pretilt angle of the liquid crystal (the angle between the director and the major surface of the substrate) in the non-activated state is, for example, not less than 0 degrees and not more than 30 degrees. In such a case, the alignment of the liquid crystal is substantially, for example, a horizontal alignment or a HAN alignment.

The dielectric anisotropy of the liquid crystal included in the liquid crystal layer 30 may be negative. For example, in the activated state in which the voltage (the voltage larger than the threshold voltage) is applied to the liquid crystal layer 30, the long-axis direction 31a of the liquid crystal molecules 31 of the liquid crystal layer 30 has a component parallel to the X-Y plane. In this state, the direction of the long-axis direction 31a of the liquid crystal molecules 31 projected onto the X-Y plane corresponds to the fifth direction D5. In the case where the dielectric anisotropy of the liquid crystal is negative, the pretilt angle of the liquid crystal in the non-activated state is, for example, not less than 60 degrees and not more than 90 degrees. In such a case, the alignment of the liquid crystal is substantially, for example, a vertical alignment or a HAN alignment.

For example, the fifth direction D5 can be determined by evaluating the optical characteristics of the liquid crystal layer 30 including polarized light. The fifth direction D5 may be determined by the alignment control direction (e.g., rubbing direction) of the liquid crystal molecules 31 of the liquid crystal layer 30. The rubbing direction can be determined by viewing the anisotropy of the nonuniformity (e.g., rubbing scratches, etc.) of the alignment of the liquid crystal layer 30 that occurs when a voltage (particularly a direct-current voltage) is applied to the liquid crystal layer 30. The liquid crystal alignment of the liquid crystal layer 30 may be formed by a photo-alignment method, etc., and may be formed by any method.

Figure 3A:
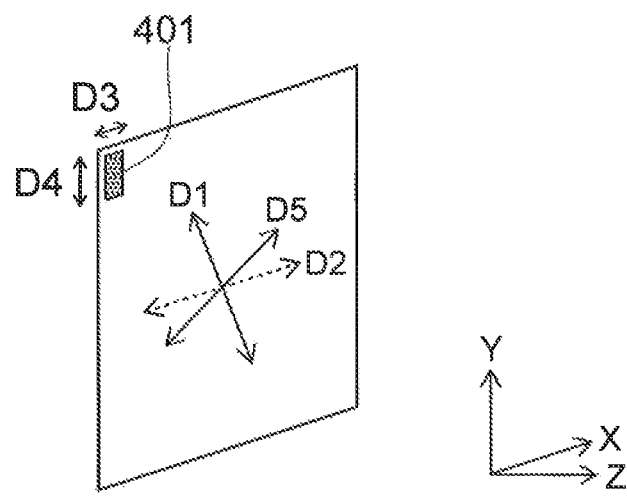
FIG. 3A and FIG. 3B are schematic views illustrating the image display device according to the first embodiment.
Figure 3B:
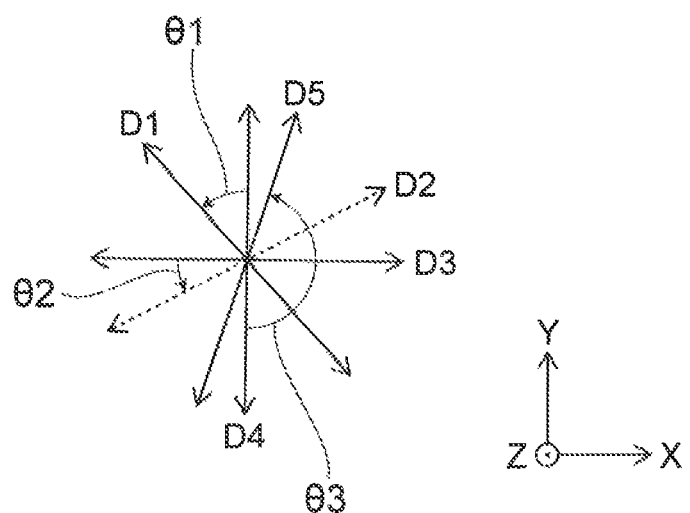

FIG. 3A and FIG. 3B are schematic views illustrating the image display device according to the first embodiment.

FIG. 3A is a schematic perspective view; and FIG. 3B is a schematic plan view.

As shown in FIG. 3A, the subpixel 401 extends in the fourth direction D4 when projected onto a plane (the X-Y plane) parallel to the first surface 10a of the first substrate 10s. For example, the fourth direction D4 is parallel to the Y-axis direction.

The first direction D1 is a direction in the plane (the X-Y plane) recited above. The second direction D2 and the fifth direction D5 may be projected onto the plane (the X-Y plane) recited above.

FIG. 3B shows the first direction D1, the second direction D2, the third direction D3, the fourth direction D4, and the fifth direction D5 projected onto the X-Y plane.

As shown in FIG. 3B, the angle in the first rotation direction to the first direction D1 from the direction of the fourth direction D4 projected onto the X-Y plane (the first surface 10a) is a first angle $\theta_1$. For example, the first angle $\theta_1$ is greater than 0 degrees and less than 90 degrees. In the example, the first rotation direction is counterclockwise. The first rotation direction may be clockwise. Hereinbelow, the case is described where the first rotation direction is counterclockwise.

On the other hand, the angle in the first rotation direction (in the example, counterclockwise) to the second direction D2 from the direction of the third direction D3 projected onto the X-Y plane is a second angle $\theta_2$. The second angle $\theta_2$ is different from the first angle $\theta_1$. For example, the second angle $\theta_2$ is greater than 0 degrees and less than 90 degrees. For example, the first angle $\theta_1$ is larger than the second angle $\theta_2$.

On the other hand, the angle in the first rotation direction (in the example, counterclockwise) to the fifth direction D5 (i.e., the direction of the long-axis direction 31a of the liquid crystal molecules 31 projected onto the X-Y plane) from the direction of the fourth direction D4 projected onto the X-Y plane is a third angle $\theta_3$.

For example, the fifth direction D5 intersects the first direction D1 and intersects the second direction D2. Also, the fifth direction D5 is positioned, for example, inside the obtuse angle between the first direction D1 and the second direction D2.

By such first to fifth directions D1 to D5, as described below, for example, it is possible to obtain and switch between a refractive index distribution in a direction orthogonal to the first direction D1 and a refractive index distribution in a direction orthogonal to the second direction D2. Thereby, an image display device that provides a high-quality display is obtained.

For example, the first operation of forming the refractive index distribution in the direction orthogonal to the first direction D1 and the second operation of forming the refractive index distribution in the direction orthogonal to the second direction D2 will be described as examples of operating states. Hereinbelow, the case is described where the liquid crystal of the liquid crystal layer 30 has positive dielectric anisotropy.

Figure 4A:
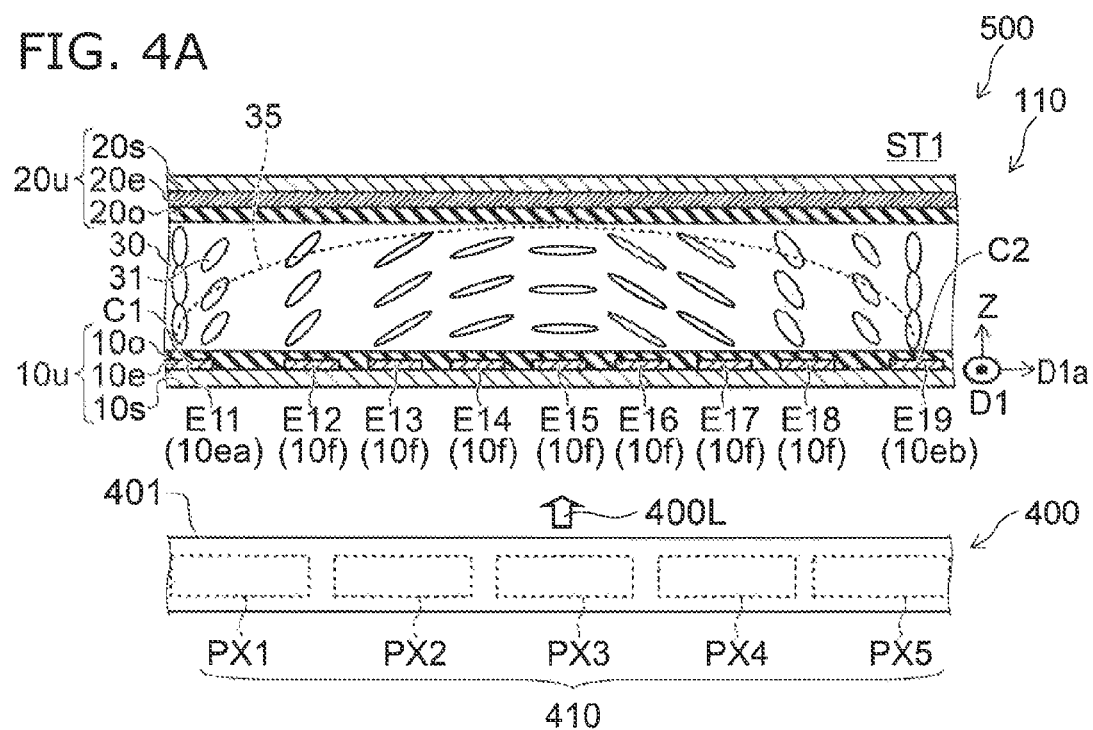
FIG. 4A and FIG. 4B are schematic views illustrating an operation of the image display device according to the first embodiment.
Figure 4B:
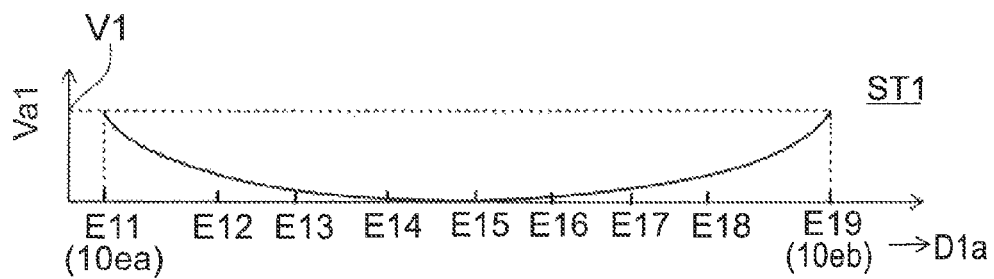

FIG. 4A and FIG. 4B are schematic views illustrating an operation of the image display device according to the first embodiment.

FIG. 4A shows the liquid crystal optical device 110 and the image display device 500 in a first state ST1. FIG. 4A is a schematic cross-sectional view when the liquid crystal optical device 110 and the image display device 500 are cut by a plane including the Z-axis direction and the direction D1a that is perpendicular to the first direction D1 and perpendicular to the Z-axis direction. FIG. 4B shows a potential Va1 to which the electrodes provided in the first substrate 10s are set in the first state ST1.

In the example as shown in FIG. 4A, multiple electrodes 10f (the first substrate-side sub electrodes) are provided between one electrode (a first most proximal electrode 10ea) of the most proximal electrodes of the multiple first electrodes 10e and the other electrode (a second most proximal electrode 10eb) of the most proximal electrodes of the multiple first electrodes 10e. The multiple electrodes 10f are provided on the first surface 10a. For example, the electrodes 10f extend in the first direction D1. The multiple electrodes 10f are separated from each other in the direction D1a. The multiple electrodes 10f are separated from the first electrodes 10e in the direction D1a.

The first substrate unit 10u further includes a first alignment film 10o. The first alignment film 10o is provided between the liquid crystal layer 30 and the first electrodes 10e and between the liquid crystal layer 30 and the electrodes 10f.

In the example, the first alignment film 10o also is provided between the first substrate 10s and the liquid crystal layer 30. On the other hand, the second substrate unit 20u further includes a second alignment film 20o. The second alignment film 20o is provided between the liquid crystal layer 30 and the second electrodes 20e. The initial alignment of the liquid crystal layer 30 is formed by performing a prescribed processing of these alignment films. Thereby, the fifth direction D5 is determined. The first alignment film 10o and the second alignment film 20o include, for example, a resin such as polyimide, etc. The thicknesses of the first alignment film 10o and the second alignment film 20o are, for example, about 200 nm (e.g., not less than 100 nm and not more than 300 nm).

A refractive index distribution can be formed inside the liquid crystal layer 30 by controlling the voltage between the first electrodes 10e and the second electrodes 20e to control the alignment of the liquid crystal layer 30. Further, in the example, the voltage between the electrodes 10f and the second electrodes 20e is controlled. Thereby, a refractive index distribution is formed inside the liquid crystal layer 30. To simplify the description hereinbelow, the potentials of the multiple second electrodes 20e in the first state ST1 are taken to be fixed. For example, the potentials of the multiple second electrodes 20e (and the potentials of electrodes 20f described below) are set to a ground potential.

On the other hand, the multiple first electrodes 10e and the multiple electrodes 10f are set to mutually-different potentials. For example, the multiple first electrodes 10e include an electrode E11 (the first most proximal electrode 10ea) and an electrode E12 (the second most proximal electrode 10eb). The multiple electrodes 10f include the electrodes E12 to E18 (the first substrate-side sub electrodes). The electrodes E11 to E19 are arranged in the direction D1a in this order. For example, the electrodes E11 to E19 are set to mutually-different potentials.

The horizontal axis of FIG. 4B is the position in the direction D1a. The vertical axis of FIG. 4B is the potential Va1 to which the electrodes E11 to E19 are set. As shown in FIG. 4B, for example, the electrode E11 and the electrode E19 are set to high potentials. On the other hand, the electrode E15 is set to a low potential. For example, the potential of the electrode E15 is set to be the same as the potential of the second electrodes 20e. The potential is set to decrease for the electrodes E12, E13, and E14 in this order. On the other hand, the potential is set to increase for the electrodes E16, E17, and E18 in this order.

The alignment of the liquid crystal layer 30 is determined by the elastic energy and the Inductive energy due to the voltage applied to the liquid crystal layer 30.

By applying such a voltage (setting such a potential), a high voltage is applied to the liquid crystal layer 30 between the electrodes E11 and E19 and the second electrodes 20e. Therefore, as shown in FIG. 4A, the angle between the Z-axis direction and the long axis of the liquid crystal molecules 31 at these portions is small. In other words, the tilt angle is large. On the other hand, the voltage applied to the liquid crystal layer 30 between the electrode E15 and the second electrodes 20e is low (e.g., 0). The angle between the Z-axis direction and the long axis of the liquid crystal molecules 31 at this portion is large. In other words, the tilt angle is small. States that are intermediate between the large tilt angle and the small tilt angle are formed in the region between the electrode E11 and the electrode E15 and the region between the electrode E19 and the electrode E15. Thus, the first state is formed by the driver 150; and a first alignment state of the liquid crystal is formed by the first state.

The liquid crystal has birefringence. The refractive index for polarized light in the long-axis direction 31a of the liquid crystal molecules 31 is higher than the refractive index in the short-axis direction of the liquid crystal molecules 31. The alignment direction of the liquid crystal of the liquid crystal layer 30 changes according to the applied voltage; and the effective refractive index changes according to the change of the alignment direction. Thereby, a refractive index distribution (a first refractive index distribution 35) is formed in the liquid crystal layer 30. In other words, a first lens is formed. The refractive index of the first refractive index distribution 35 (the first lens) changes along the direction D1a. Then, the refractive index along the first direction D1 is substantially constant. For example, the first lens is formed in a lenticular configuration.

Such most proximal electrodes of the multiple first electrodes 10e (the first most proximal electrodes 10ea and 10eb) are used as one set. In the example, the electrodes E11 to E19 are used as one set. The set is multiply provided; and the multiple sets are arranged along the direction D1a. Thereby, the first lens is multiply provided. For example, multiple cylindrical lenses extending along the first direction D1 are arranged along the direction D1a orthogonal to the first direction D1.

For example, the position corresponding to the electrode E11 and the position corresponding to the electrode E19 correspond to the lens edges. The position corresponding to the electrode E15 corresponds to the lens center.

Thus, in the first state ST1, the first refractive index distribution 35 (the first lens) is formed along the direction D1a that is perpendicular to the first direction D1 and perpendicular to the Z-axis direction. The liquid crystal optical device 110 functions as, for example, a liquid crystal GRIN lens (Gradient Index lens). FIG. 4A shows one lens of the liquid crystal GRIN lens. Such a lens is multiply formed along the direction D1a.

In such a case, the image displayer 400 includes, for example, multiple sub pixel groups 410 (e.g., first to fifth pixels PX1 to PX5, etc.). The multiple sub pixel groups 410 are aligned, for example, in a matrix configuration in the plane (e.g., the X-Y plane) parallel to the subpixel 401. Multiple parallax images are displayed by the multiple sub pixel groups 410. The multiple parallax images are, for example, images corresponding to the parallax of the viewer. The light (the image light 400L) that includes the multiple parallax images is incident on the liquid crystal optical device 110.

As described above, the first substrate 10s and the second substrate 20s are light-transmissive. For example, the first electrodes 10e and the second electrodes 20e are light-transmissive. The image light 400L that is emitted from the image displayer 400 passes through the first substrate 10s, the second substrate 20s, the first electrodes 10e, and the second electrodes 20e. A three-dimensional image is perceived by viewing the image light 400L including the multiple parallax images via the first refractive index distribution 35 (the first lens) formed in the liquid crystal optical device 110.

In other words, the multiple parallax images that are formed by the sub pixel groups 410 of the image displayer 400 by the lenses having the lenticular configurations formed in the liquid crystal optical device 110 are selectively incident on the right eye or the left eye of the viewer. Thereby, the three-dimensional image is perceived.

Thus, in the first state ST1, a first three-dimensional image that utilizes the first refractive index distribution 35 (the first lens) along the direction D1a perpendicular to the first direction D1 can be displayed.

On the other hand, in the case where the voltage is not applied to the liquid crystal layer 30, the refractive index of the liquid crystal layer 30 is constant. At this time, the display image of the image displayer 400 is an image without parallax. Thereby, a high definition two-dimensional image is provided.

Figure 5A:
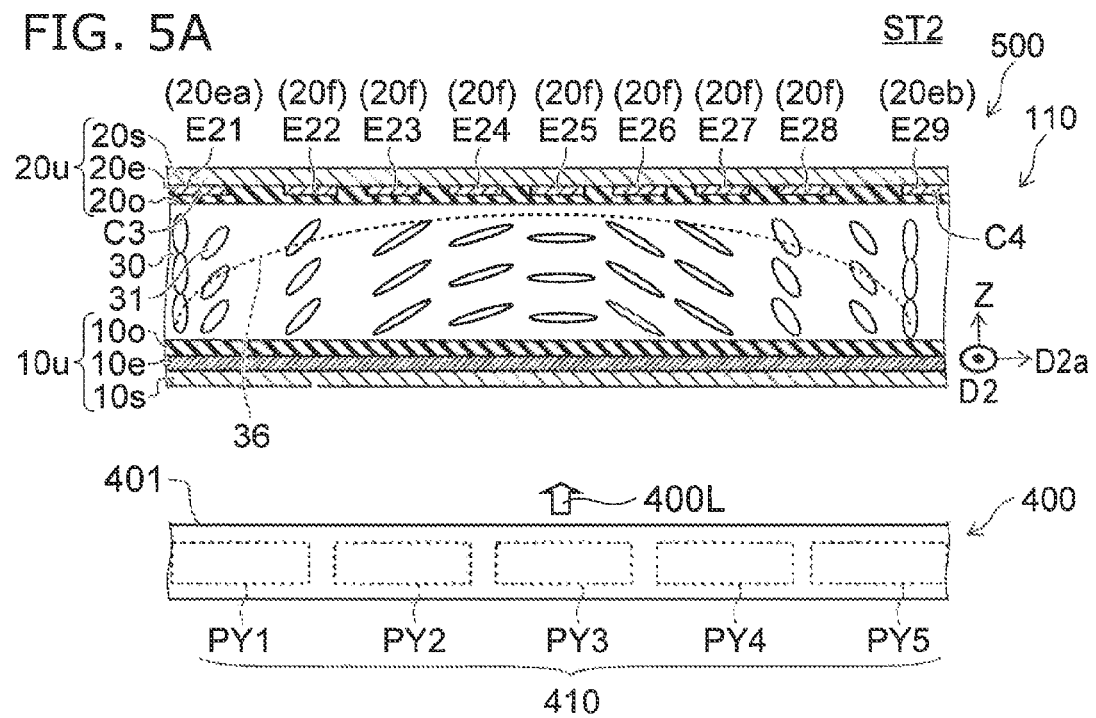
FIG. 5A and FIG. 5B are schematic views illustrating another operation of the image display device according to the first embodiment.
Figure 5B:
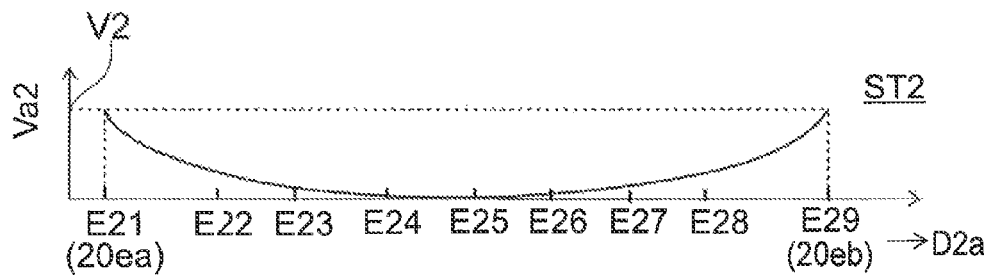

FIG. 5A and FIG. 5B are schematic views illustrating another operation of the image display device according to the first embodiment.

FIG. 5A shows the liquid crystal optical device 110 and the image display device 500 in a second state ST2. FIG. 5A is a schematic cross-sectional view when the liquid crystal optical device 110 and the image display device 500 are cut by a plane including the Z-axis direction and the direction D2a that is perpendicular to the second direction D2 and perpendicular to the Z-axis direction. FIG. 5B shows a potential Va2 to which the electrodes that are provided in the second substrate 20s are set in the second state ST2.

In the example as shown in FIG. 5A, the multiple electrodes 20f (the second substrate-side sub electrodes) are provided between the one electrode (a third most proximal electrode 20ea) of the most proximal electrodes of the multiple second electrodes 20e and the other electrode (a fourth most proximal electrode 20eb) of the most proximal electrodes of the multiple second electrodes 20e. The multiple electrodes 20f are provided on the second surface 20a. For example, the electrodes 20f extend in the second direction D2. The multiple electrodes 20f are separated from each other in the direction D2a. The multiple electrodes 20f are separated from the second electrodes 20e in the direction D2a.

In the second state ST2, for example, the potentials of the multiple first electrodes 10e are fixed. For example, the potentials of the multiple first electrodes 10e (and the multiple electrodes 10f) are set to the ground potential.

Then, the multiple second electrodes 20e and the multiple electrodes 20f are set to mutually-different potentials. For example, the second electrodes 20e include an electrode E21 (the third most proximal electrode 20ea) and an electrode E29 (the fourth most proximal electrode 20eb). For example, the electrodes 10f include the electrodes 10f and electrodes E22 to E28. The electrodes E21 to E29 are arranged in the direction D2a in this order. For example, the electrodes E21 to E29 are set to mutually-different potentials.

The horizontal axis of FIG. 5B is the position in the direction D2a. The vertical axis of FIG. 5B is the potential Va2 to which the electrodes E21 to E29 are set. As shown in FIG. 5B, for example, the electrode E21 and the electrode E29 are set to a high potential. On the other hand, the electrode E25 is set to a low potential. For example, the potential of the electrode E25 is set to be the same as the potential of the first electrodes 10e. The potential is set to decrease for the electrodes E22, E23, and E24 in this order. On the other hand, the potential is set to increase for the electrodes E26, E27, and E28 in this order.

By setting such potentials, a high voltage is applied to the liquid crystal layer 30 between the electrodes E21 and E29 and the first electrodes 10e; and the tilt angle is large. On the other hand, the voltage that is applied to the liquid crystal layer 30 between the electrode E25 and the first electrode 10e is low (e.g., 0); and the tilt angle is small. Thus, the second state is formed by the driver 150; and a second alignment state of the liquid crystal is formed by the second state.

The refractive index distribution (a second refractive index distribution 36) of the liquid crystal layer 30 is formed by the second alignment state. In other words, a second lens is formed. The refractive index of the second refractive index distribution 36 (the second lens) changes along the direction D2a. The refractive index in the second direction D2 is substantially constant.

Thus, in the second state ST2, the second refractive index distribution 36 (the second lens) is formed along the direction D2a that is perpendicular to the second direction D2 and perpendicular to the Z-axis direction.

Such most proximal electrodes of the multiple second electrodes 20e (the third most proximal electrodes 20ea and 20eb) are used as one set. In the example, the electrodes E21 to E29 are used as one set. The set is multiply provided; and the multiple sets are arranged along the direction D2a. Thereby, the second lens is multiply provided. For example, multiple cylindrical lenses that extend along the second direction D2 are arranged along the direction D2a orthogonal to the second direction D2.

For example, the position corresponding to the electrode E21 and the position corresponding to the electrode E29 correspond to the lens edges. The position corresponding to the electrode E25 corresponds to the lens center.

On the other hand, in the second state ST2, for example, the multiple sub pixel groups 410 (e.g., first to fifth pixels PY1 to PY5, etc.) are formed in the image displayer 400. The arrangement direction of the first to fifth pixels PY1 to PY5, etc., is different from the arrangement direction of first to fifth pixels PX1 to PX5. In such a case as well, multiple parallax images are displayed by the multiple sub pixel groups 410 (e.g., the first to fifth pixels PY1 to PY5, etc.).

A three-dimensional image is perceived by viewing the image light 400L including the multiple parallax images via the second lens having the second refractive index distribution 36 formed in the liquid crystal optical device 110. Thus, in the second state ST2, a second three-dimensional image that utilizes the second refractive index distribution 36 (the second lens) along the direction D2a perpendicular to the second direction D2 can be displayed.

Thus, in the liquid crystal optical device and the image display device according to the embodiment as recited above, a first three-dimensional image display that utilizes the first refractive index distribution 35 (the first lens), a second three-dimensional image display that utilizes the second refractive index distribution 36 (the second lens), and a two-dimensional image display that does not use a lens are provided.

Thus, the driver 150 implements the first operation of forming the first refractive index distribution 35 in the liquid crystal layer 30 along the direction D1a perpendicular to the first direction D1 by setting the voltage between the multiple first electrodes 10e and the multiple second electrodes 20e to be in the first state.

Also, the first driver 150 implements the second operation of forming the second refractive index distribution 36 in the liquid crystal layer 30 along the direction D2a perpendicular to the second direction D2 by setting the voltage between the multiple first electrodes 10e and the multiple second electrodes 20e to be in the second state.

In the first operation recited above, the driver 150 sets the difference between the potential of the first electrode and the potential of the second electrode to be, for example, a first potential difference. For example, the absolute value of the difference between the potential of the second electrodes and the potential of the electrodes provided between the one and the other most proximal electrodes of the multiple first electrodes is set to be lower than the absolute value of the first potential difference. For example, the multiple electrodes are set to the potentials shown in FIG. 4B.

In the second operation recited above, the driver 150 sets the difference between the potential of the second electrodes and the potential of the first electrodes to, for example, a second potential difference. For example, the absolute value of the difference between the potential of the first electrodes and the potential of the electrodes provided between the one and the other most proximal electrodes of the multiple second electrodes is set to be lower than the absolute value of the second potential difference. For example, the multiple electrodes are set to the potentials shown in FIG. 5B.

Figure 6A:
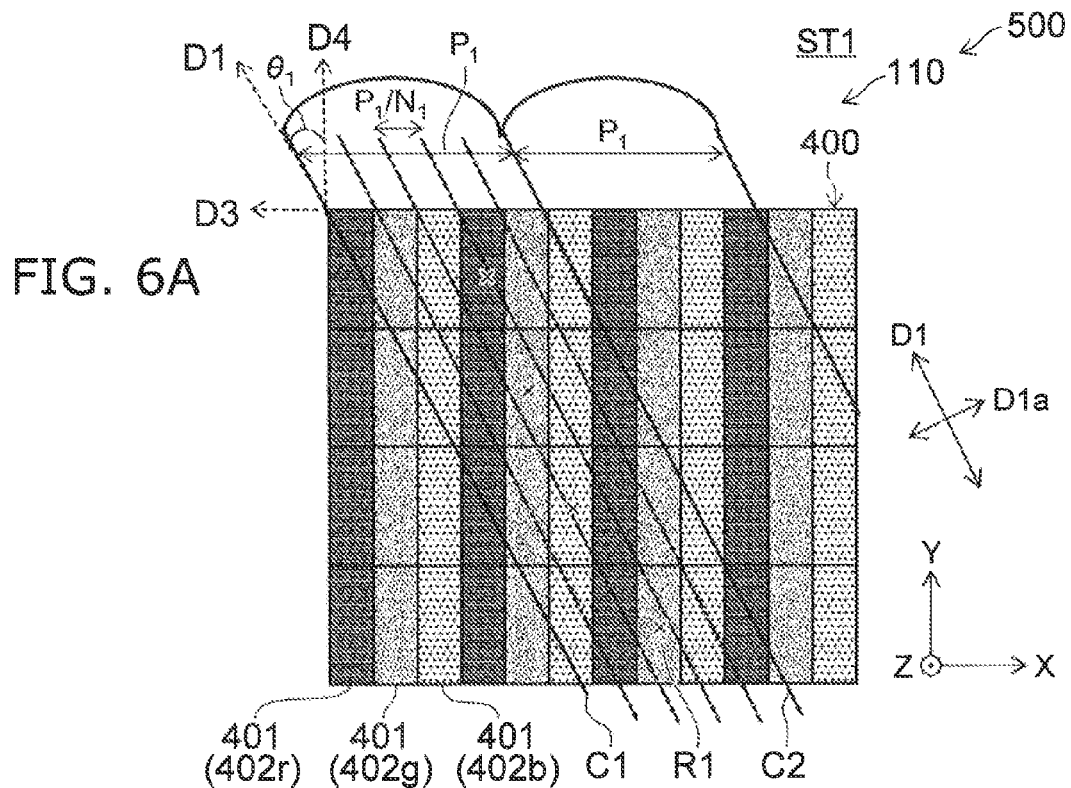
FIG. 6A and FIG. 6B are schematic views illustrating operations of the image display device according to the first embodiment.
Figure 6B:
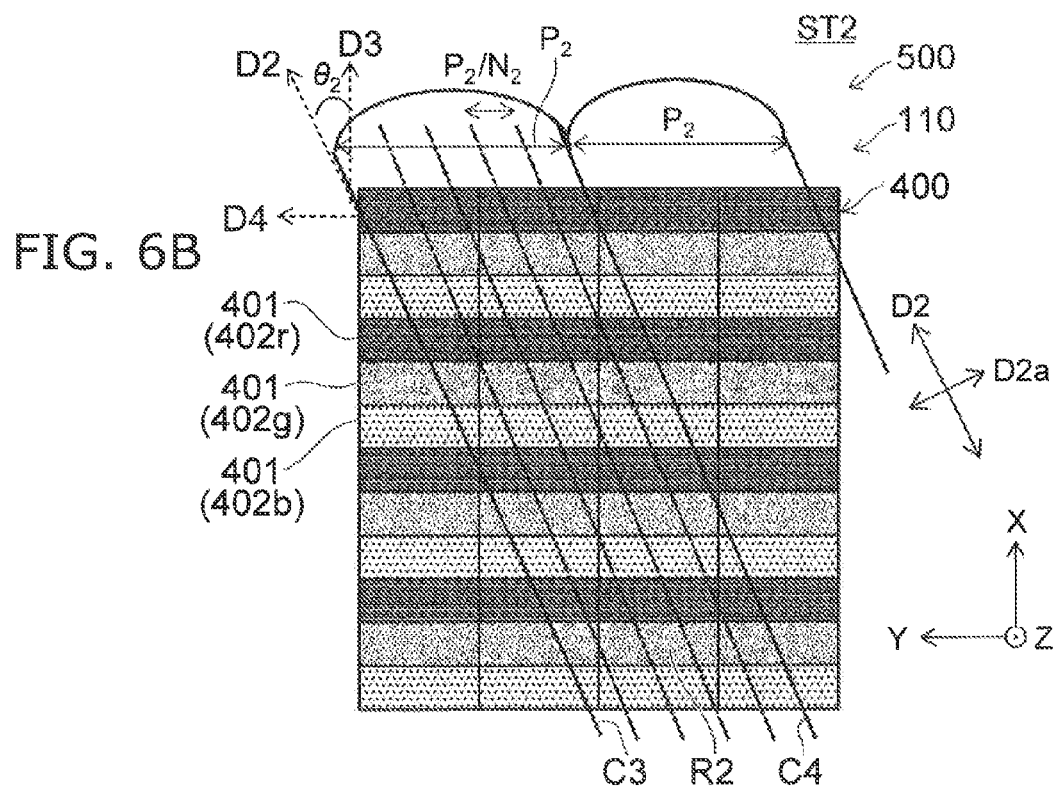

FIG. 6A and FIG. 6B are schematic views illustrating operations of the image display device according to the first embodiment.

FIG. 6A and FIG. 6B show the first state ST1 and the second state ST2.

For example, as shown in FIG. 6A, the major surface (e.g., the first surface 10a) of the liquid crystal optical device 110 is substantially a rectangle. For example, in the first state ST1, the long sides of the liquid crystal optical device 110 are disposed in the horizontal direction (in the example, the X-axis direction). The image displayer 400 is disposed to correspond to the disposition of the liquid crystal optical device 110. In other words, the long sides of the screen of the image display device 500 are disposed in the horizontal direction. For example, the length along the X-axis direction of the third side 13 is longer than the length along the Y-axis direction of the first side 11. This display state is used, for example, in the case where a landscape is displayed. This display state may be used for other displays.

On the other hand, in the second state ST2 as shown in FIG. 6B, the long sides of the liquid crystal optical device 110 are disposed in the vertical direction. In other words, the long sides of the screen of the image display device 500 are disposed in the vertical direction. This display state is used, for example, in the case where a portrait is displayed. This display state may be used for other displays.

Thus, it is desirable for the image display device 500 to be used for a landscape disposition or for a portrait disposition. In other words, it is desirable to switch the display screen between a landscape state and a portrait state.

For example, in the case where a liquid crystal GRIN lens is not used, it is possible to easily switch between the landscape disposition and the portrait disposition by modifying the display data displayed by the image displayer 400. In other words, in the case where the two-dimensional image is displayed, it is easy to switch between the landscape disposition and the portrait disposition.

However, to display the three-dimensional image using the liquid crystal GRIN lens, it becomes necessary to form appropriate refractive index distributions for both the landscape disposition and the portrait disposition. Even if the refractive index distribution is formed along the left and right direction (the parallax direction of the viewer) in the display state of the landscape disposition, the appropriate three-dimensional display is not provided when switched to the portrait disposition if a refractive index distribution that is along the vertical direction is formed instead of a refractive index distribution along the left and right direction.

Conversely, in the liquid crystal optical device and the image display device according to the embodiment, it is possible to switch between the first three-dimensional image display that utilizes the first refractive index distribution 35 (the first lens) and the second three-dimensional image display that utilizes the second refractive index distribution 36 (the second lens). Thereby, a good three-dimensional image can be provided even in the case where the image display device 500 is used in the landscape disposition and in the portrait disposition.

For example, the driver 150 (or the controller 200) switches the liquid crystal optical device 110 to the first state ST1 (e.g., the operating state corresponding to the landscape disposition); and the second driver 450 switches the image displayer 400 to the three-dimensional image display state corresponding to the landscape disposition. Then, the driver 150 (or the controller 200) switches the liquid crystal optical device 110 to the second state ST2 (e.g., the operating state corresponding to the portrait disposition); and the second driver 450 switches the image displayer 400 to the three-dimensional image display state corresponding to the portrait disposition. Further, the driver 150 (or the controller 200) switches the liquid crystal optical device 110 to a third state in which the refractive index is constant (e.g., the state in which the liquid crystal layer 30 is non-activated); and the second driver 450 switches the image displayer 400 to a two-dimensional image display state.

In the image display device 500, the two-dimensional image display (the third state) and the three-dimensional image display (the first state ST1 and the second state ST2) in which stereoscopic viewing with the naked eyes can be performed are possible by changing the distribution of the refractive index of the liquid crystal optical device 110. Then, the three-dimensional image display is possible even when the screens of the image displayer 400 and the liquid crystal optical device 110 are rotated 90 degrees. In the embodiment, it is possible to selectively switch between three such types of display operations.

For example, the image display device 500 is held in the hand of the viewer and rotated by the viewer in the X-Y plane. For example, as shown in FIG. 6A, in the state (the landscape disposition) in which the subpixels 401 appear to be in the portrait state, the first operation is implemented; and the state is switched to the first state. For example, as shown in FIG. 6B, in the state (the portrait disposition) in which the subpixels 401 appear to be in the landscape state, the second operation is implemented; and the state is switched to the second state. For example, the portrait disposition of FIG. 6B corresponds to the landscape disposition of FIG. 6A when the image display device 500 is rotated 90 degrees in the X-Y plane.

In the first state ST1, for example, the position corresponding to the first most proximal electrode 10ea and the position corresponding to the second most proximal electrode 10eb correspond to the lens edges of the liquid crystal layer 30. A first distance $P_1$ along the third direction between a first center C1 in the first perpendicular direction D1a of the first most proximal electrode 10ea and a second center C2 in the first perpendicular direction D1a of the second most proximal electrode 10eb corresponds to the pitch of the lenses of the liquid crystal layer 30 in the first state ST1.

The image displayer 400 causes the light including information of a parallax image having a first parallax number $N_1$ to be incident on the liquid crystal layer 30 provided between the first most proximal electrode 10ea and the second most proximal electrode 10eb.

In the state of the first operation, the liquid crystal layer 30 includes a first region R1 between the first most proximal electrode 10ea and the second most proximal electrode 10eb when projected onto the first surface 10a.

In the state of the first operation, the image displayer 400 causes the light including the information of the first parallax image having the first parallax number $N_1$ to be incident on the first region R1.

In the second state ST2, for example, the position corresponding to the third most proximal electrode 20ea and the position corresponding to the fourth most proximal electrode 20eb correspond to the lens edges of the liquid crystal layer 30. A second distance $P_2$ along the fourth direction between a third center C3 in the second perpendicular direction D2a of the third most proximal electrode 20ea and a fourth center C4 in the second perpendicular direction D2a of the fourth most proximal electrode 20eb corresponds to the pitch of the lenses of the liquid crystal layer 30 in the second state ST2.

The image displayer 400 causes light including information of a parallax image having a second parallax number $N_2$ to be incident on the liquid crystal layer 30 provided between the third most proximal electrode 20ea and the fourth most proximal electrode 20eb.

In the state of the second operation, the liquid crystal layer 30 includes a second region R2 between the third most proximal electrode 20ea and the fourth most proximal electrode 20eb when projected onto the first surface 10a.

In the state of the second operation, the image displayer 400 causes the light including the information of the second parallax image having the second parallax number $N_2$ to be incident on the second region R2.

In the example, the multiple subpixels 401 include a multiple first subpixels 402r, multiple second subpixels 402g, and multiple third subpixels 402b.

The first subpixel 402r is capable of emitting a first light of a first peak wavelength. The second subpixel 402g is capable of emitting a second light of a second peak wavelength. The second peak wavelength is different from the first peak wavelength. The third subpixel 402b is capable of emitting a third light of a third peak wavelength. The third peak wavelength is different from the first peak wavelength and different from the second peak wavelength. The first light is, for example, red light; the second light is, for example, green light; and the third light is, for example, blue light. The colors of the first to third light are mutually interchangeable.

For example, one first subpixel 402r, one second subpixel 402g, and one third subpixel 402b are used as one display component.

For example, the multiple first subpixels 402r are arranged in a direction aligned with the fourth direction D4. The multiple second subpixels 402g are arranged in a direction aligned with the fourth direction D4. The multiple third subpixels 402b are arranged in a direction aligned with the fourth direction D4.

Figure 7:
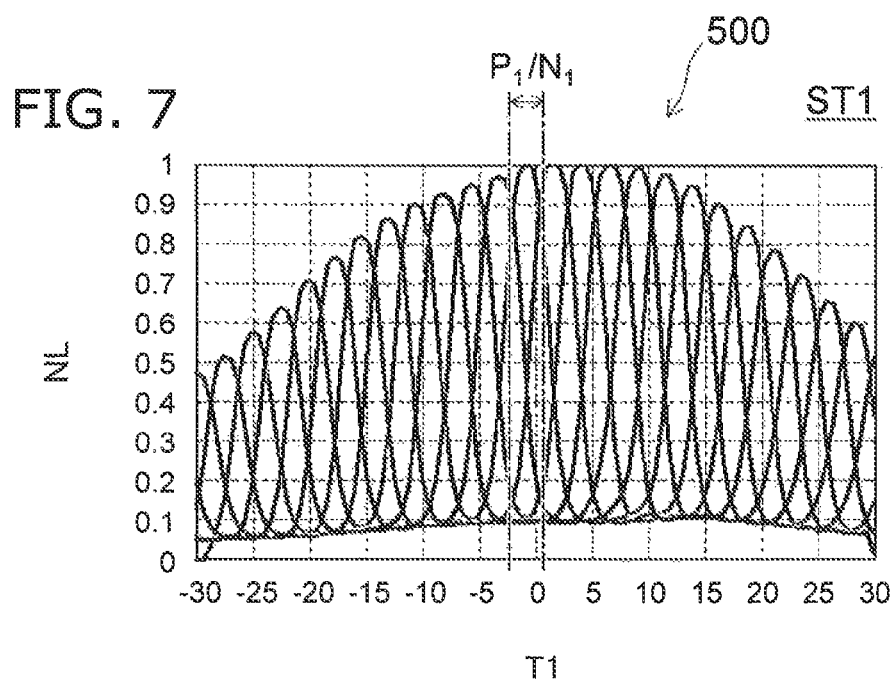
FIG. 7 is a graph of a characteristic of the image display device according to the first embodiment.

FIG. 7 is a graph of a characteristic of the image display device according to the first embodiment.

FIG. 7 shows the luminance of the image display device 500 in the first state ST1.

The horizontal axis of FIG. 7 is an angle T1 when viewing the image display device 500. The vertical axis of FIG. 7 is a normalized luminance NL.

The parallax number is the number of directions for the image displayed by the image displayer 400, that is, the number of viewpoints. For example, in the case where the image displayer 400 displays an image having a parallax number of 6, a luminance profile having six peaks between the first most proximal electrode 10ea and the second most proximal electrode 10eb is obtained.

Figure 8:
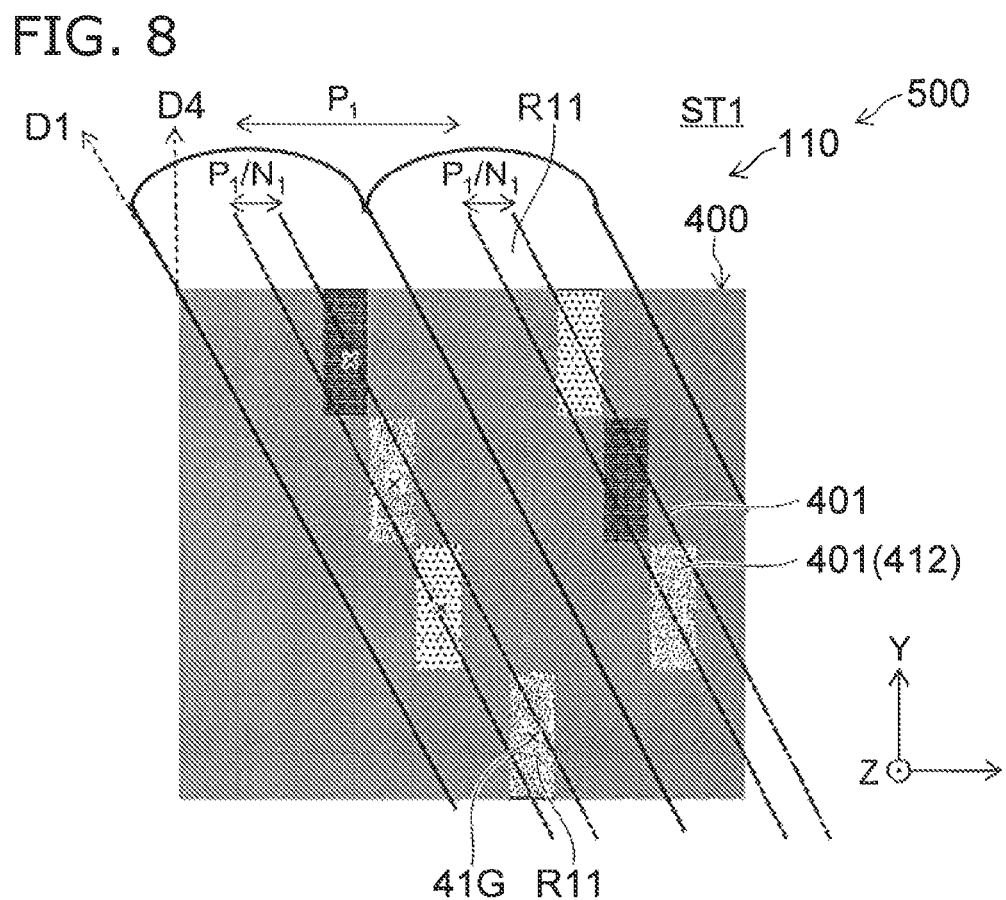
FIG. 8 is a schematic view illustrating an operation of the image display device according to the first embodiment.

FIG. 8 is a schematic view illustrating an operation of the image display device according to the first embodiment.

FIG. 8 shows the operation of the image display device 500 in the first state ST1. In the example, the image displayer 400 emits only the light corresponding to one parallax of the information of the image having multiple parallax numbers. In other words, among the multiple subpixels 401, only subpixels 412 that correspond to one parallax are turned on. An image is displayed in which the subpixels that are turned on are only the subpixels 401 having a centroid 41G inside the region formed when subdividing the region having a width of the first distance $P_1$ (the first lens pitch) by the first parallax number $N_1$ along the third direction D3. The angular distribution of the luminance of the image is measured. Thereby, the luminance profile corresponding to one parallax can be obtained. In the first state ST1, the width (the length along the third direction D3) of a region R11 where the image corresponding to the one parallax is displayed is $P_1/N_1$.

For example, in the second state ST2, the region corresponding to one parallax is the region formed when subdividing the region having a width of the second distance $P_2$ (the second lens pitch) by the second parallax number $N_2$ along the fourth direction D4. In the second state ST2, the width (the length along the fourth direction D4) of a region R12 where the image corresponding to the one parallax is displayed is $P_2/N_2$.

Figure 9A:
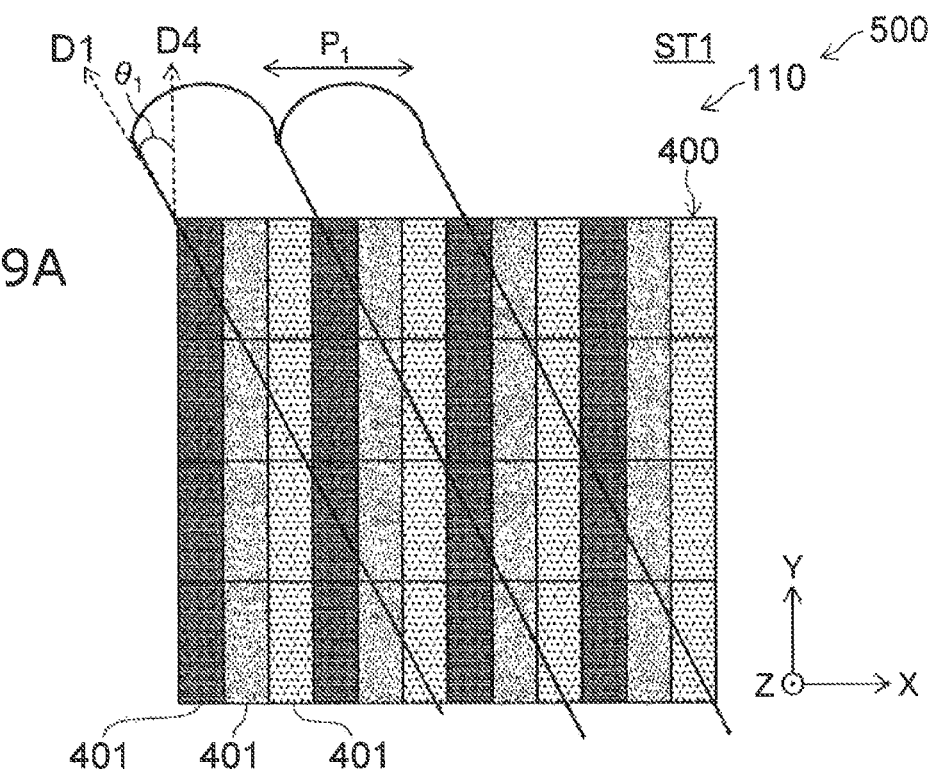
FIG. 9A and FIG. 9B are schematic views illustrating an operation of the image display device according to the first embodiment.
Figure 9B:
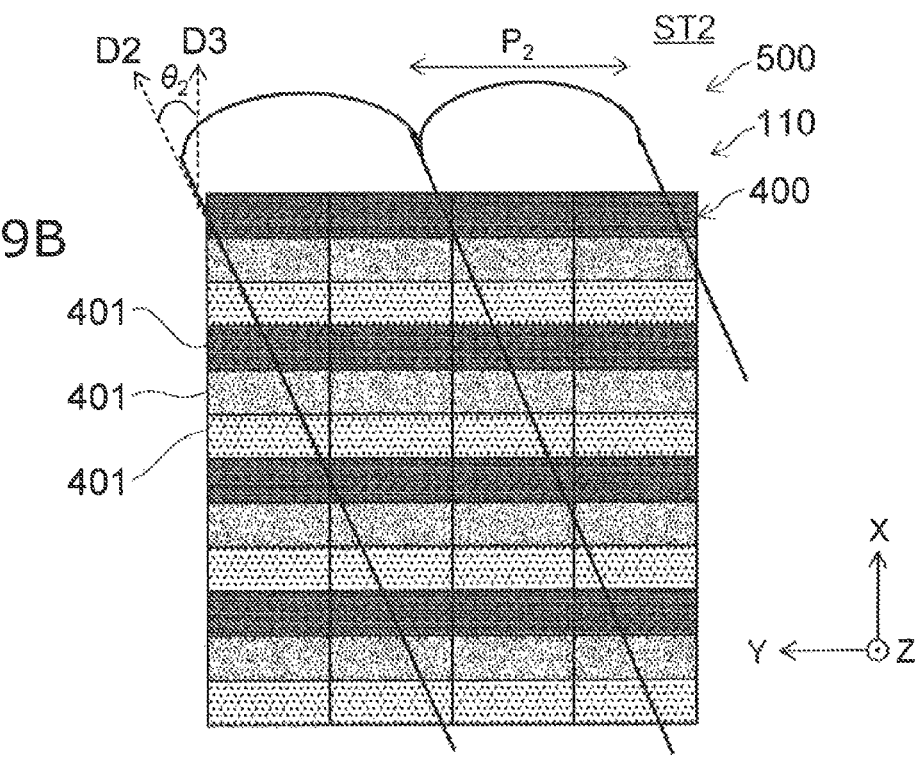

FIG. 9A and FIG. 9B are schematic views illustrating an operation of the image display device according to the first embodiment.

FIG. 9A shows the operation of the image display device 500 in the first state ST1 (the landscape disposition).

FIG. 9B shows the operation of the image display device 500 in the second state ST2 (the portrait disposition).

As shown in FIG. 9A, the angle between the first direction D1 and the fourth direction D4 when projected onto the X-Y plane is the first angle $\theta_1$. In other words, the angle between the fourth direction D4 and the direction in which the lens formed by the refractive index distribution of the liquid crystal layer 30 extends when projected onto the X-Y plane is the first angle $\theta_1$. In the first state, the pitch of the lenses is the first distance $P_1$.

As shown in FIG. 9B, the angle between the second direction D2 and the third direction D3 when projected onto the X-Y plane is the second angle $\theta_2$. In other words, the angle between the third direction D3 and the direction in which the lens formed by the refractive index distribution of the liquid crystal layer 30 extends when projected onto the X-Y plane is the second angle $\theta_2$. In the second state, the pitch of the lenses is the second distance $P_2$.

For example, the lenses formed in the liquid crystal layer 30 are provided to be oblique to the sides of the rectangular subpixels when projected onto the X-Y plane. In other words, the absolute value of the first angle $\theta_1$ is greater than zero. The absolute value of the second angle $\theta_2$ is greater than zero. Thereby, moiré of the image that is displayed can be suppressed.

For example, in the first state ST1, the light including the parallax image having the first parallax number $N_1$ is incident on one lens (the region having the width $P_1$) disposed to be oblique to the subpixels. The region where the light corresponding to the one parallax is incident extends in a direction aligned with, for example, the first direction D1.

For example, in the second state ST2, the light including the parallax image having the second parallax number $N_2$ is incident on one lens (the region having the width $P_2$) disposed to be oblique to the subpixels. The region where the light corresponding to the one parallax is incident extends in a direction aligned with, for example, the second direction D2.

There are cases where crosstalk occurs in which the light that corresponds to one parallax mixes into a region that corresponds to another parallax. The display quality of the three-dimensional image decreases due to the crosstalk.

Conversely, in the embodiment, the first distance $P_1$ is shorter than the second distance $P_2$. Thereby, the crosstalk in the second state ST2 can be less than the crosstalk in the first state ST1.

For example, the first distance $P_1$ is about 0.25 mm. For example, the first angle $\theta_1$ is about 26 degrees. For example, the second distance $P_2$ is about 0.3 mm. For example, the second angle $\theta_2$ is about 26 degrees. Thereby, the crosstalk in the second state ST2 can be less than the crosstalk in the first state ST1.

Figure 10A:
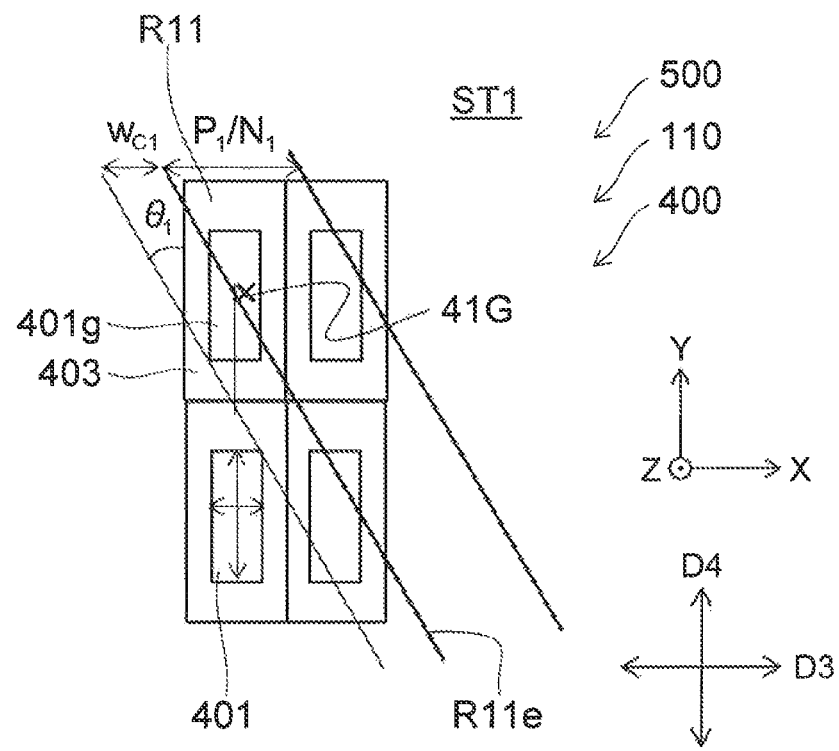
FIG. 10A and FIG. 10B are schematic views illustrating the image display device according to the first embodiment.
Figure 10B:
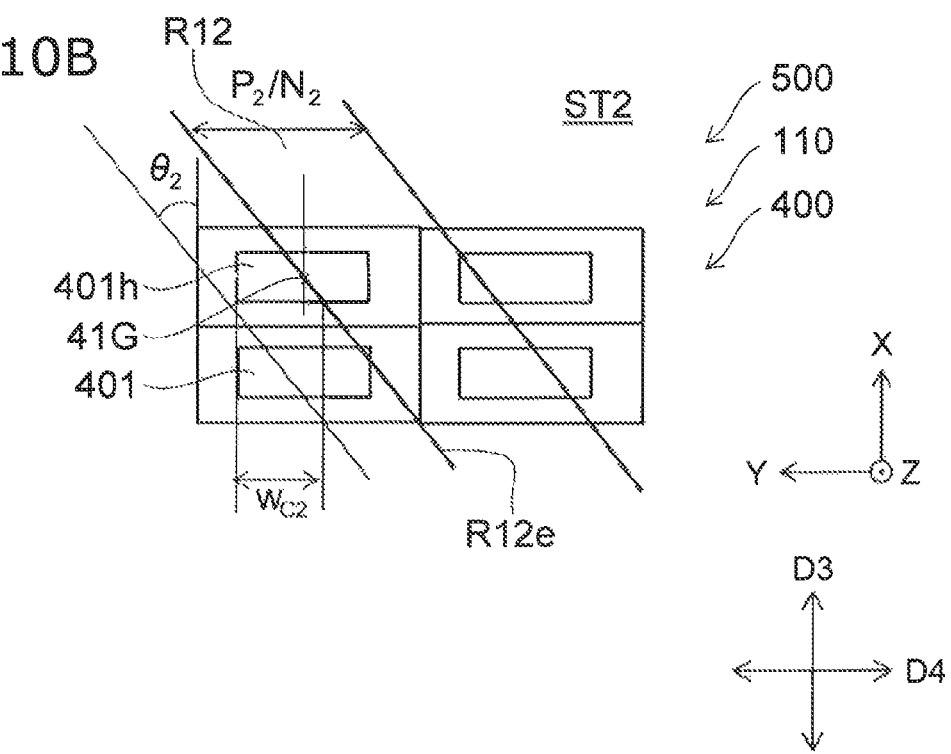

FIG. 10A and FIG. 10B are schematic views illustrating the image display device according to the first embodiment.

FIG. 10A shows the image display device 500 in the first state ST1. FIG. 10A shows the region R11 and a maximum jutting amount $W_{C1}$ corresponding to one parallax in the first state ST1.

As shown in FIG. 10A, for example, a boundary line R11e of the region R11 overlaps the centroid 41G of one subpixel 401g of the multiple subpixels 401 when projected onto the X-Y plane. The maximum jutting amount $W_{C1}$ is the distance along the third direction D3 between the boundary line R11e and the portion of the subpixel 401g not overlapping the region R11 when projected onto the X-Y plane. When the maximum jutting amount $W_{C1}$ is large, the light from the region R11 easily mixes into a region corresponding to another parallax adjacent to the region R11. When the maximum jutting amount $W_{C1}$ is large, the crosstalk increases easily.

The maximum jutting amount $W_{C1}$ is expressed by $$w_{c1} = w_{ap1}/2 + w_{ap2}/2 \times \tan\theta_1.$$

Here, $w_{ap1}$ is the first length 42W1. $w_{ap2}$ is the second length 42W2.

The proportion (a normalized crosstalk $r_{aL}$) of the maximum jutting amount $W_{C1}$ to the width ($P_1/N_1$) of one parallax region (the region R11 where the image corresponding to one parallax is displayed) is expressed by $$r_{aL} = w_{C1}/(P_1/N_1).$$

FIG. 10B shows the image display device 500 in the second state ST2. FIG. 10B shows a maximum jutting amount $W_{C2}$ and the region R12 corresponding to one parallax in the second state ST2.

As shown in FIG. 10B, for example, a boundary line R12e of the region R12 overlaps the centroid 41G of one subpixel 401h of the multiple subpixels 401 when projected onto the X-Y plane. The maximum jutting amount $W_{C2}$ is the distance along the fourth direction D4 between the boundary line R12e and the portion of the subpixel 401h not overlapping the region R12 when projected onto the X-Y plane.

The maximum jutting amount $W_{C2}$ is expressed by $$w_{C2} = w_{ap2}/2 + w_{ap1}/2 \times \tan\theta_2.$$

The proportion (a normalized crosstalk $r_{aP}$) of the maximum jutting amount $W_{C2}$ to the width ($P_2/N_2$) of one parallax region (the region R12 where the image corresponding to one parallax is displayed) is expressed by $$r_{aP} = w_{C2}/(P_2/N_2).$$

The proportion of the maximum jutting amount to the width of the one parallax region is defined as the normalized crosstalk.

To set the normalized crosstalk in the second state ST2 (e.g., the portrait disposition) to be not more than the normalized crosstalk in the first state ST1 (e.g., the landscape disposition), it is sufficient for the structure to satisfy, for example, the following formula.

$$r_{aL} \geq r_{aP}$$

$$\frac{N_1(w_{ap1} + w_{ap2} \times \tan\theta_1)}{2 \times P_1} \geq \frac{N_2(w_{ap2} + w_{ap1} \times \tan\theta_2)}{2 \times P_2}$$

Figure 11:
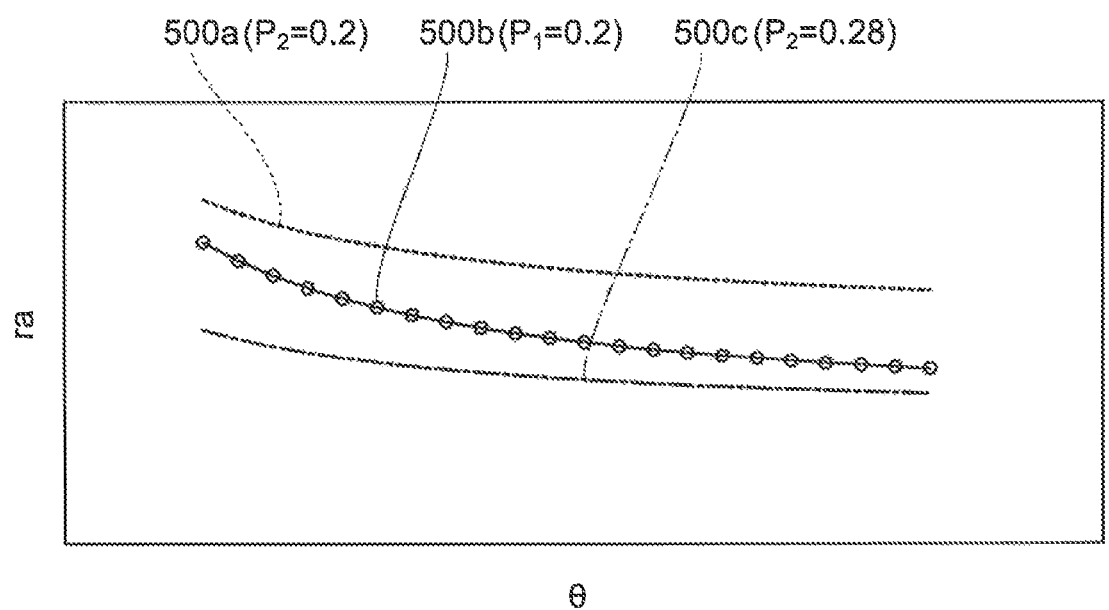
FIG. 11 is a graph of characteristics of image display devices.

FIG. 11 is a graph of characteristics of image display devices.

FIG. 11 shows the normalized crosstalk obtained by simulation. FIG. 11 shows the normalized crosstalk of the image display devices 500a to 500c. The liquid crystal optical device 110, the image displayer 400, etc., are provided in the image display devices 500a to 500c as well.

In the image display device 500a, the second distance $P_2$ is 0.2 mm. In other words, the lens pitch in the second state ST2 is 0.2 mm. In FIG. 11, the image display device 500a operates in the second state ST2.

In the image display device 500b, the first distance $P_1$ is 0.2 mm. In other words, the lens pitch in the first state ST1 is 0.2 mm. In FIG. 11, the image display device 500b operates in the first state ST1.

In the image display device 500c, the second distance $P_2$ is 0.28 mm. In other words, the lens pitch in the second state ST2 is 0.28 mm. In FIG. 11, the image display device 500c operates in the second state ST2.

Otherwise, configurations similar to that of the image display device 500 are applicable to the image display devices 500a to 500c.

In the example, the opening ratio for the second opening width (the second length 42W2) is set to 40%. The opening ratio for the first opening width (the first length 42W1) is set to 85%. The first parallax number $N_1$ is set to 6. The second parallax number $N_2$ is set to 6.

The vertical axis of FIG. 11 is the normalized crosstalk ra ($r_{aL}$ or the $r_{aP}$). The normalized crosstalk ra refers to the normalized crosstalk $r_{aL}$ when the image display device is in the first state ST1. The normalized crosstalk ra refers to the normalized crosstalk $r_{aP}$ when the image display device is in the second state ST2.

The horizontal axis of FIG. 11 is an angle θ (the first angle $θ_1$ or the second angle $θ_2$). The angle θ is the first angle $θ_1$ when the image display device is in the first state ST1. The angle θ is the second angle $θ_2$ when the image display device is in the second state ST2.

As shown in FIG. 11, the normalized crosstalk ra of the image display device 500a in the second state ST2 is larger than the normalized crosstalk ra of the image display device 500b in the first state ST1. In other words, in the case where the first distance $P_1$ and the second distance $P_2$ are the same (in the example, 0.2 mm), the crosstalk increases more easily in the second state ST2 than in the first state ST1.

The normalized crosstalk ra of the image display device 500c in the second state ST2 is smaller than the normalized crosstalk ra of the image display device 500b in the first state ST1. In other words, by setting the second distance $P_2$ to be longer than the first distance $P_1$, the crosstalk in the second state ST2 can be smaller than the crosstalk in the first state ST1.

Figure 12A:
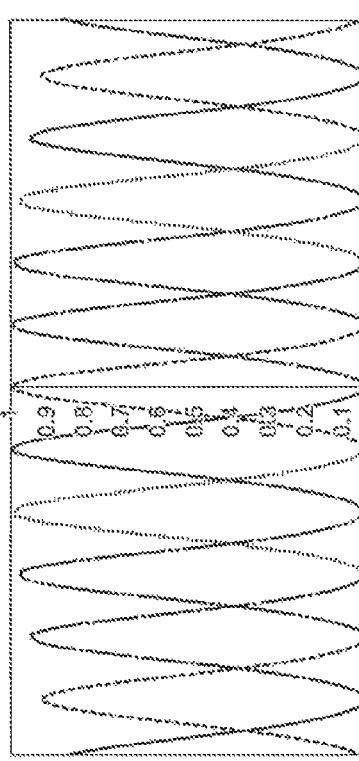
FIG. 12A and FIG. 12B are graphs of characteristics of the image display devices.
Figure 12B:
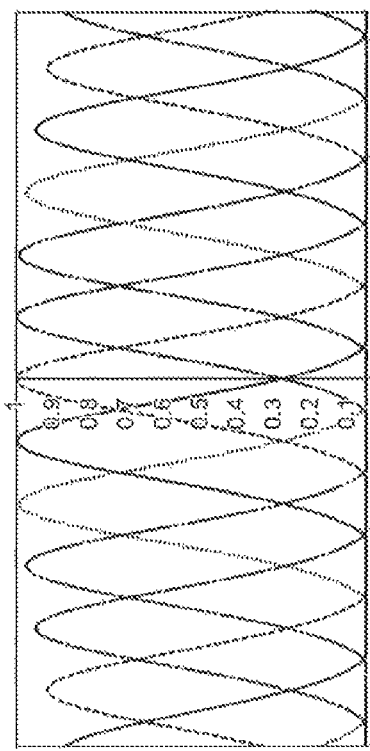

FIG. 12A and FIG. 12B are graphs of characteristics of the image display devices.

FIG. 12A shows the luminance of the image display device 500a in the second state ST2. FIG. 12B shows the luminance of the image display device 500c in the second state ST2.

In FIG. 12A and FIG. 12B, the horizontal axis is the angle T1 when viewing the image display devices. In FIG. 12B, the vertical axis is the normalized luminance NL.

In FIG. 12A, the overlap between one luminance peak and the adjacent luminance peak is large. On the other hand, in FIG. 12B, the overlap between one luminance peak and the adjacent luminance peak is small. In other words, the crosstalk of the image display device 500c in which the second distance $P_2$ is long is less than the crosstalk of the image display device 500b in which the second distance $P_2$ is short. By setting the second distance $P_2$ to be long, the crosstalk in the second state ST2 can be reduced.

In the embodiment, the first distance $P_1$ along the third direction D3 between the center in the direction perpendicular to the first direction D1 of the one electrode 10ea of the most proximal electrodes of the multiple first electrodes 10e and the center in the direction perpendicular to the first direction D1 of the other electrode 10eb of the most proximal electrodes of the multiple first electrodes 10e is shorter than the second distance $P_2$ along the fourth direction D4 between the center in the direction perpendicular to the second direction D2 of the one electrode 20ea of the most proximal electrodes of the multiple second electrodes 20e and the center in the direction perpendicular to the second direction D2 of the other electrode 20eb of the most proximal electrodes of the multiple second electrodes 20e. Thereby, compared to the crosstalk in the first state ST1, the crosstalk in the second state ST2 can be suppressed. A high-quality display can be provided.

In the image display device 500, the multiple first electrodes 10e and the multiple second electrodes 20e are light-transmissive. By setting the first electrodes 10e and the second electrodes 20e to a prescribed potential, a liquid crystal GRIN lens is formed in the liquid crystal layer 30. Thereby, a three-dimensional image is displayed.

In the example, a liquid crystal GRIN lens is used as the optical opening. For example, the optical opening may not include the liquid crystal GRIN lens. For example, in the state of the first operation, the liquid crystal layer 30 may include portions along the first direction D1 that are light-shielding to visible light by setting the potential of the multiple first electrodes 10e. For example, in the state of the second operation, the liquid crystal layer 30 may include portions that are along the second direction D2 and light-shielding to visible light by setting the potential of the multiple second electrodes. Such an active barrier is used as the optical opening. Thereby, a three-dimensional image may be displayed.

Second Embodiment

Figure 13:
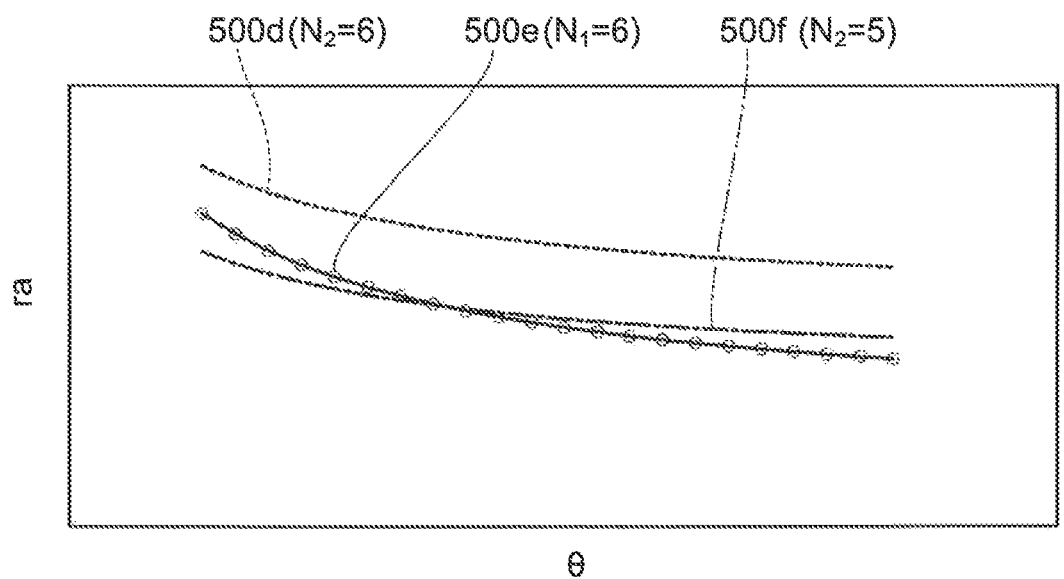
FIG. 13 is a graph of characteristics of image display devices.

FIG. 13 is a graph of characteristics of image display devices.

FIG. 13 shows the normalized crosstalk obtained by simulation. FIG. 13 shows the normalized crosstalk of the image display devices 500d to 500f. The liquid crystal optical device 110, the image displayer 400, etc., are provided in the image display devices 500d to 500f as well.

In the image display device 500d, the second parallax number $N_2$ is 6. In FIG. 13, the image display device 500d operates in the second state ST2.

In the image display device 500e, the first parallax number $N_1$ is 6. In FIG. 13, the image display device 500e operates in the first state ST1.

In the image display device 500f, the second parallax number $N_2$ is 5. In FIG. 13, the image display device 500f operates in the second state ST2. Otherwise, configurations similar to that of the image display device 500 are applicable to the image display devices 500d to 500f.

In the example, the opening ratio for the second opening width (the second length 42W2) is set to 40%. The opening ratio for the first opening width (the first length 42W1) is set to 85%. The first distance $P_1$ is set to 0.25 mm. The second distance $P_2$ is set to 0.25 mm.

The vertical axis of FIG. 13 is the normalized crosstalk ra ($r_{aL}$ or the $r_{aP}$). The horizontal axis of FIG. 13 is the angle θ (the first angle $θ_1$ or the second angle $θ_2$).

As shown in FIG. 13, the normalized crosstalk ra in the second state ST2 of the image display device 500d is larger than the normalized crosstalk ra in the first state ST1 of the image display device 500e. In other words, in the case where the first parallax number $N_1$ and the second parallax number $N_2$ are the same, the crosstalk increases more easily in the second state ST2 than in the first state ST1.

The normalized crosstalk ra in the second state ST2 of the image display device 500f is smaller than the normalized crosstalk ra in the first state ST1 of the image display device 500e (in the region where the angle θ is small). In other words, by setting the second parallax number $N_2$ to be smaller than the first parallax number $N_1$, the crosstalk in the second state ST2 can be smaller than the crosstalk in the first state ST1.

Figure 14A:
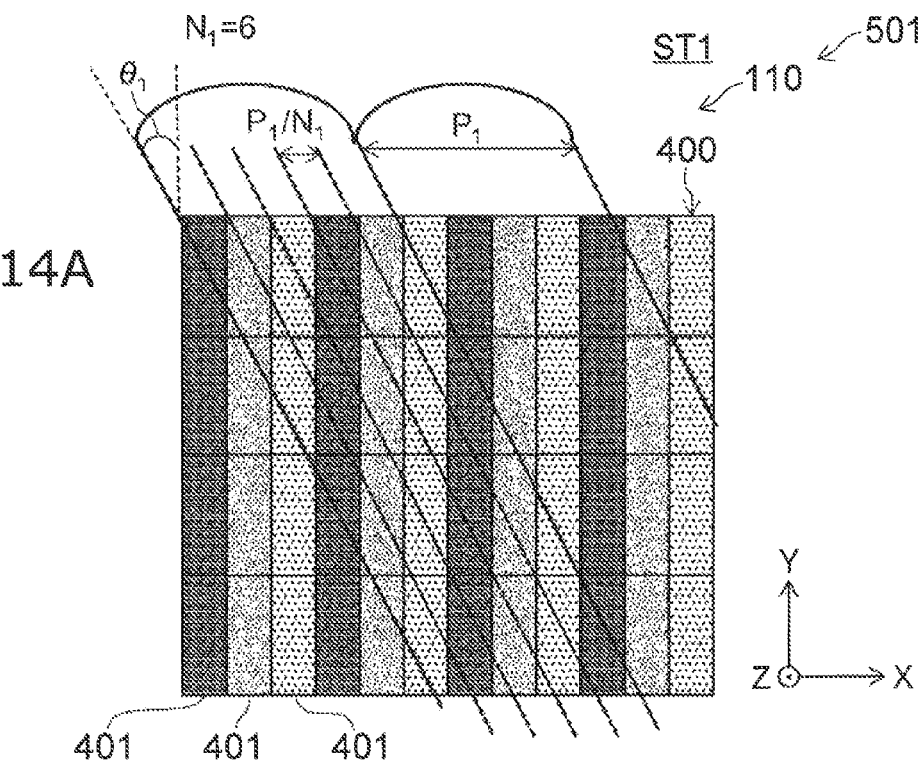
FIG. 14A and FIG. 14B are schematic views illustrating an image display device according to a second embodiment.
Figure 14B:
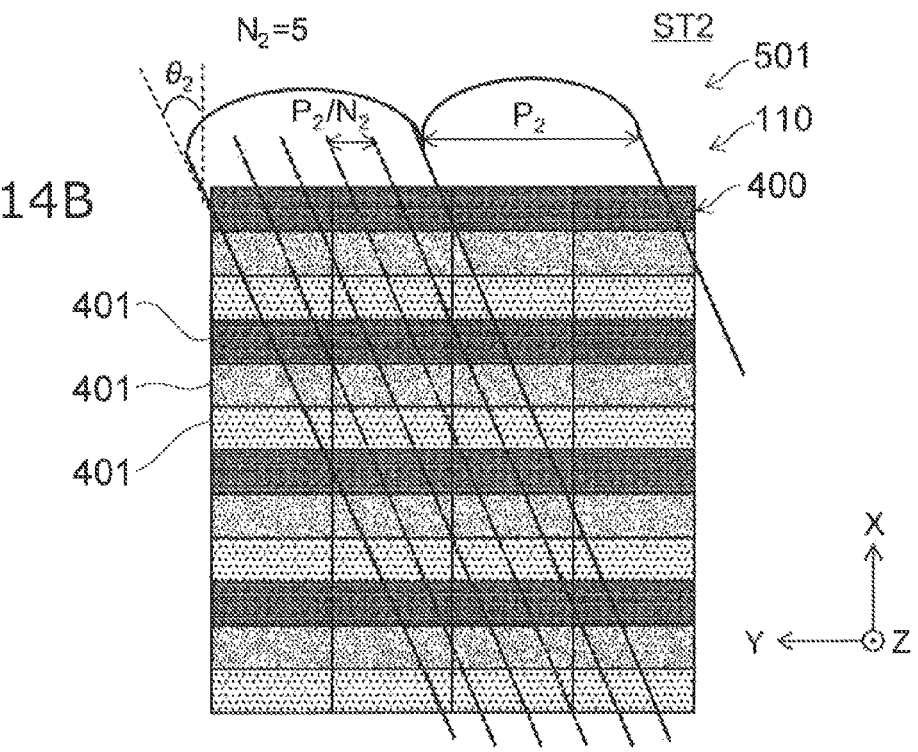

FIG. 14A and FIG. 14B are schematic views illustrating an image display device according to a second embodiment.

FIG. 14A shows the image display device 501 in the first state ST1. FIG. 14B shows the image display device 501 in the second state ST2.

The liquid crystal optical device 110, the image displayer 400, etc., are provided in the image display device 501 according to the embodiment as well. In the image display device 501, the first parallax number $N_1$ is larger than the second parallax number $N_2$. Otherwise, a configuration similar to the configuration described in regard to the image display device 500 is applicable to the image display device 501.

In the example, the first parallax number $N_1$ is 6. The second parallax number $N_2$ is 5. In the first state ST1 as shown in FIG. 14A, light that includes information of a parallax image having the first parallax number $N_1$ is incident on a lens having a width of the first distance $P_1$. In the second state ST2 as shown in FIG. 14B, light including information of a parallax image having the second parallax number $N_2$ is incident on a lens having a width of the second distance $P_2$.

In the image display device of the embodiment, the first parallax number $N_1$ is larger than the second parallax number $N_2$. Thereby, the crosstalk in the second state ST2 can be reduced. A high-quality display can be provided.

Third Embodiment

Figure 15A:
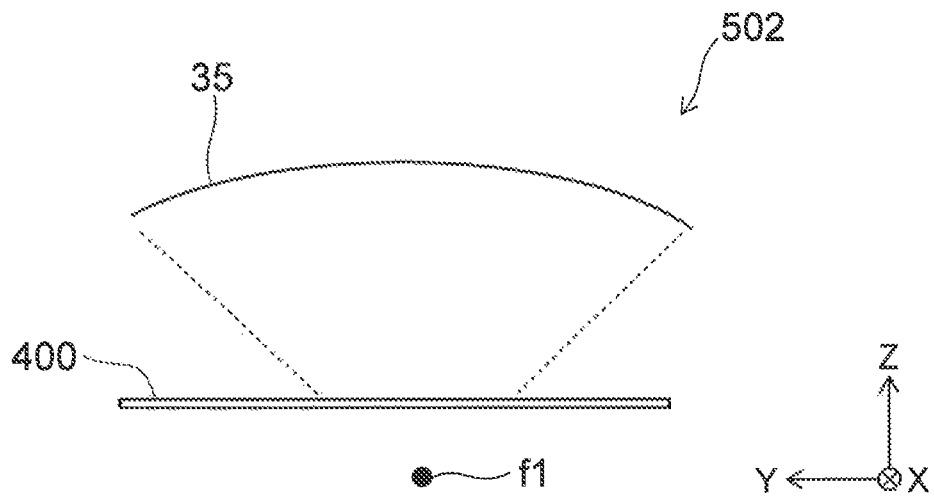
FIG. 15A and FIG. 15B are schematic views illustrating an image display device according to a third embodiment.
Figure 15B:
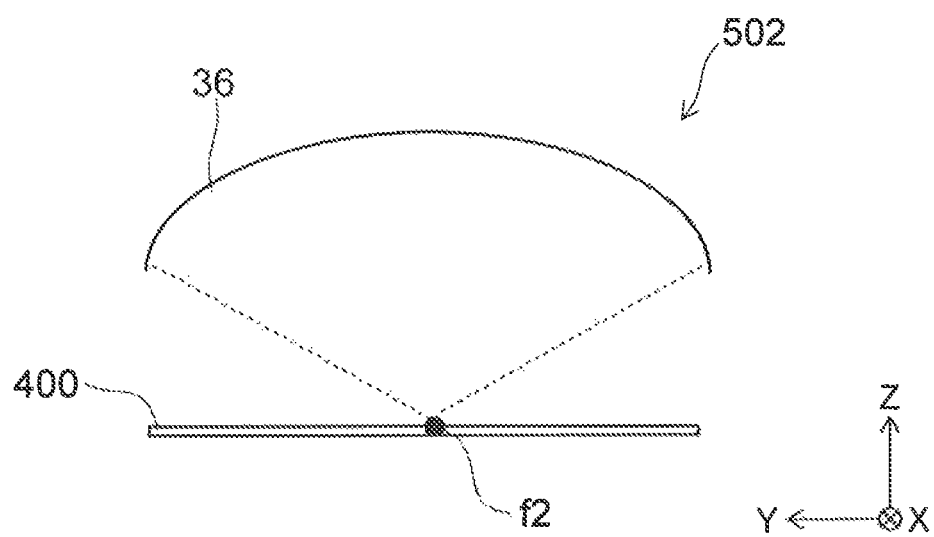

FIG. 15A and FIG. 15B are schematic views illustrating an image display device according to a third embodiment.

FIG. 15A shows the first state ST1 of the image display device 502 according to the embodiment. FIG. 15B shows the second state ST2 of the image display device 502 according to the embodiment.

The liquid crystal optical device 110, the image displayer 400, etc., are provided in the image display device 502 as well. A configuration similar to that of the image display device 500 is applicable to the image display device 502.

In the first state ST1 as shown in FIG. 15A, the first lens (the first refractive index distribution 35) has, for example, a focal point f1.

In the second state ST2 as shown in FIG. 15B, the second lens (the second refractive index distribution 36) has, for example, a focal point f2.

In the embodiment, the distance between the image displayer 400 and the focal point f1 of the liquid crystal layer 30 of the first refractive index distribution 35 is longer than the distance between the image displayer 400 and the focal point f2 of the liquid crystal layer 30 of the second refractive index distribution 36.

For example, the focal point f1 exists at a position distal to the position of the image displayer 400. For example, the focal point f2 matches the position of the image displayer 400. Thereby, the sense of resolution of the stereoscopic image in the first state ST1 and the sense of resolution of the stereoscopic image in the second state ST2 can approach each other (e.g., be the same).

Fourth Embodiment

Figure 16A:
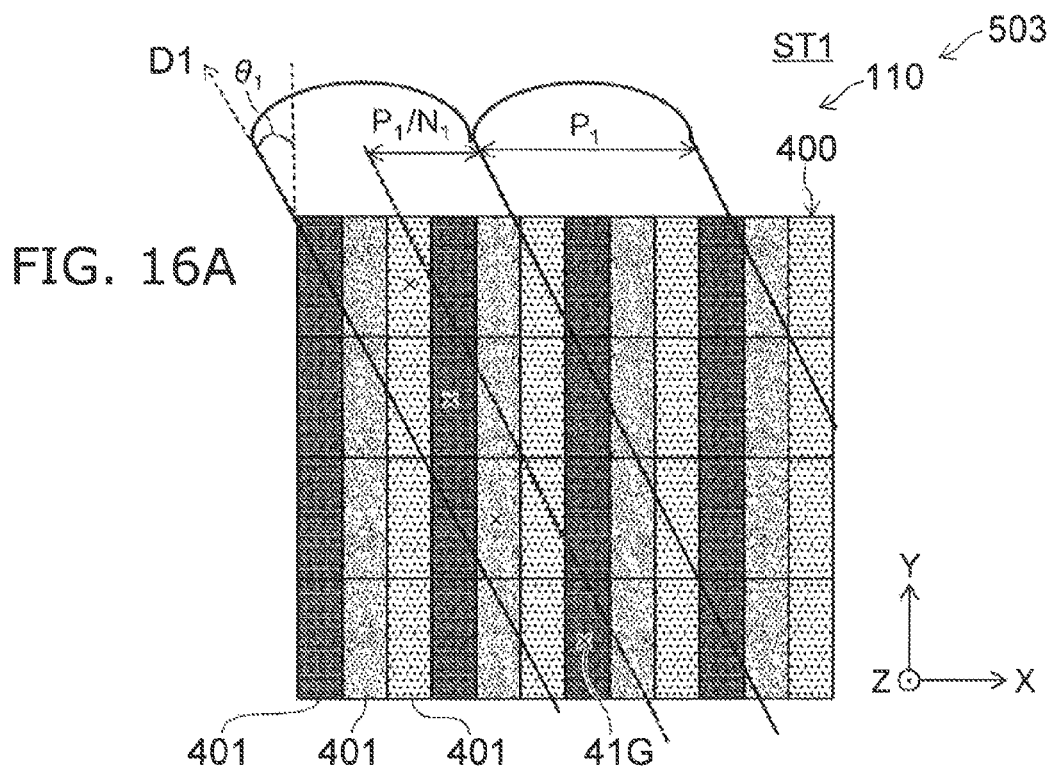
FIG. 16A and FIG. 16B are schematic views illustrating an image display device according to a fourth embodiment.
Figure 16B:
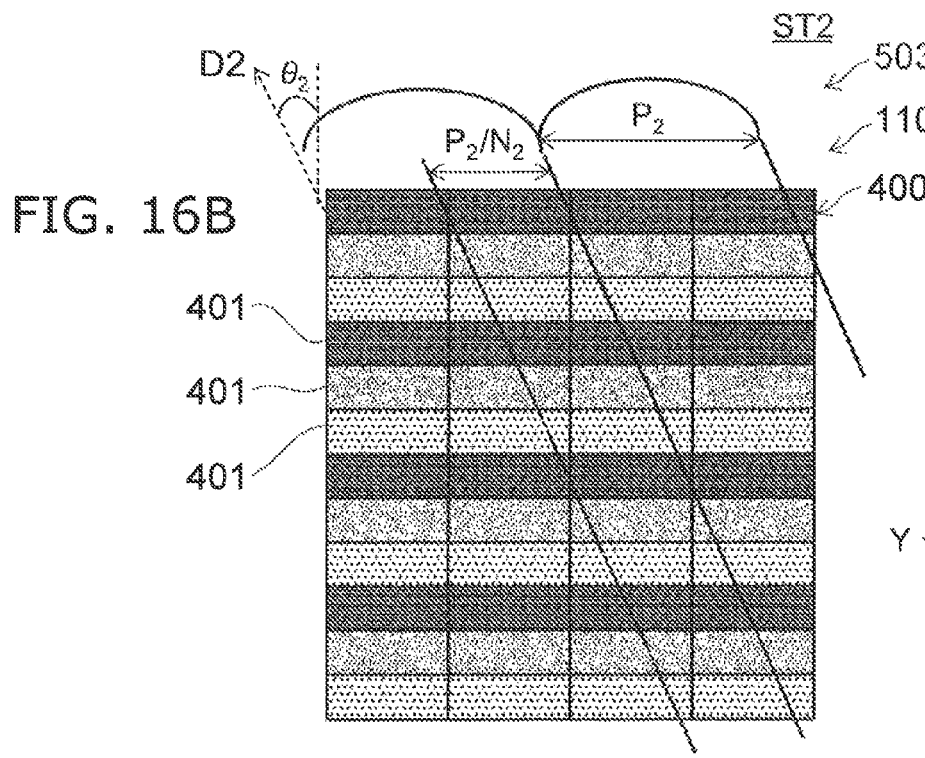

FIG. 16A and FIG. 16B are schematic views illustrating an image display device according to a fourth embodiment.

FIG. 16A shows the first state ST1 of the image display device 503 according to the embodiment. FIG. 16B shows the second state ST2 of the image display device 503 according to the embodiment.

The liquid crystal optical device 110, the image displayer 400, etc., are provided in the image display device 503 as well. A configuration similar to that of the image display device 500 is applicable to the image display device 503.

In the embodiment, the first parallax number $N_1$ is 2. The second parallax number $N_2$ is 2. The first distance $P_1$ is shorter than the second distance $P_2$.

As shown in FIG. 16A, the width $P_1/N_1$ of the region where the image corresponding to one parallax is displayed is half of the lens pitch (the first distance $P_1$). As shown in FIG. 16B, the width $P_2/N_2$ of the region where the image corresponding to the one parallax is displayed is half of the lens pitch (the second distance $P_2$).

By setting the parallax number to be 2, the probability of images of different parallax being allotted to a subpixel and its adjacent subpixel decreases. Thereby, the crosstalk can be suppressed further.

Fifth Embodiment

Figure 17:
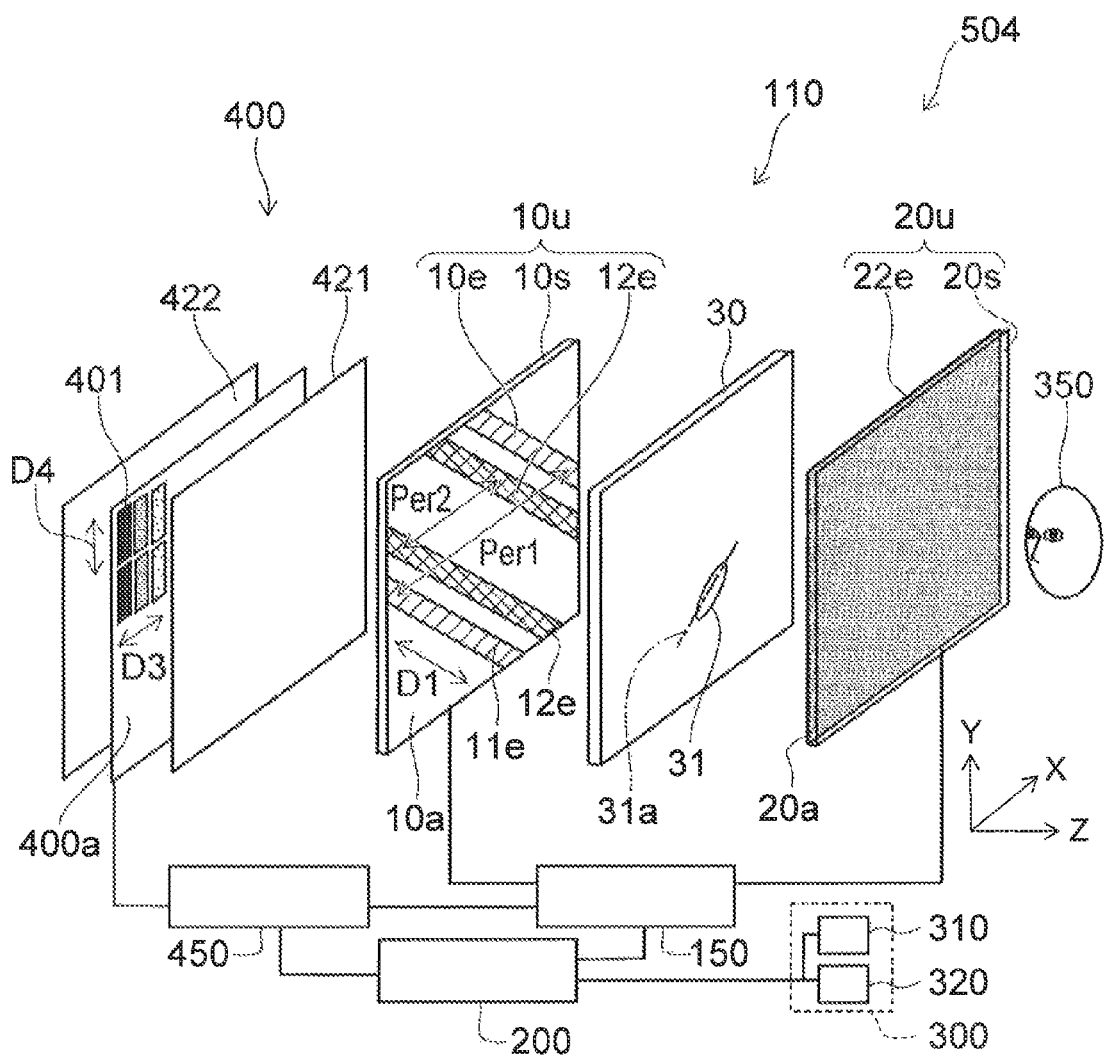
FIG. 17 is a schematic view illustrating an image display device according to a fifth embodiment.

FIG. 17 is a schematic view illustrating an image display device according to a fifth embodiment.

As shown in FIG. 17, the image display device 504 includes the liquid crystal optical device 110 and the image displayer 400.

The liquid crystal optical device 110 includes the first substrate unit 10u, the second substrate unit 20u, the liquid crystal layer 30, and the driver 150 (the first driver).

The first substrate unit 10u includes the first substrate 10s and the multiple first electrodes 10e. The first substrate 10s has the first surface 10a.

The multiple first electrodes 10e are provided on the first surface 10a. Each of the multiple first electrodes 10e extends in the first direction D1. The multiple first electrodes 10e are separated from each other in the direction D1a intersecting (e.g., orthogonal to) the first direction D1.

The second substrate unit 20u includes the second substrate 20s and an opposing electrode 22e. The second substrate 20s has the second surface 20a. The second surface 20a opposes the first surface 10a.

The opposing electrode 22e is provided on the second surface 20a. The opposing electrode 22e has, for example, a sheet configuration.

In the image display device 504, such a liquid crystal optical device 110 is stacked with the image displayer 400. In other words, the image displayer 400 is stacked with the liquid crystal optical device 110.

The driver 150 is electrically connected to the multiple first electrodes 10e and the opposing electrode 22e. The alignment of the liquid crystal of the liquid crystal layer 30 changes according to the voltage between the opposing electrode 22e and the first electrodes 10e. Multiple lenses extending in the X-Y plane are formed in the liquid crystal layer 30.

For example, the multiple first electrodes 10e include a first group of electrodes 11e and a second group of electrodes 12e.

The first group of electrodes 11e are selected from the multiple first electrodes 10e at a first period Per1. The second group of electrodes 12e are selected from the multiple first electrodes 10e at a second period Per2. The first period Per1 is longer than the second period Per2.

The driver 150 sets the voltage between the opposing electrode 22e and the multiple first electrodes 10e to the first state. The driver 150 is capable of implementing the first operation of forming the refractive index distribution (the first refractive index distribution) in the liquid crystal layer 30 along the first perpendicular direction D1a by setting the first group of electrodes 11e to the first potential V1.

The driver 150 sets the voltage between the opposing electrode 22e and the second group of electrodes 12e to the second state. The driver 150 is capable of implementing the second operation of forming the refractive index distribution (the second refractive index distribution) along the first perpendicular direction D1a by setting the second group of electrodes 12e to the second potential V2.

For example, in the image display device 504, the first angle $\theta_1$ is not less than 35 degrees and not more than 55 degrees. For example, the first angle $\theta_1$ is about 45 degrees.

Otherwise, a configuration similar to the configuration described in regard to the image display device 500 is applicable to the image display device 504.

For example, in the state (the first state) of the first operation, the pitch of the lenses formed in the liquid crystal layer 30 is the first period Per1. In the state (the second state) of the second operation, the pitch of the lenses formed in the liquid crystal layer 30 is the second period Per2. Thus, the pitch of the lenses formed in the liquid crystal layer 30 can be adjusted by adjusting the potentials of the first group of electrodes 11e, the second group of electrodes 12e, and the opposing electrode 22e. The lens pitch is changed according to the image displayed by the image displayer 400. Thereby, the crosstalk can be suppressed.

Sixth Embodiment

In the embodiment, the first state ST1 and the second state ST2 recited above are switched by sensing the rotation or the tilt of the image display device 500. Such an operation is performed by, for example, the controller 200.

Figure 18:
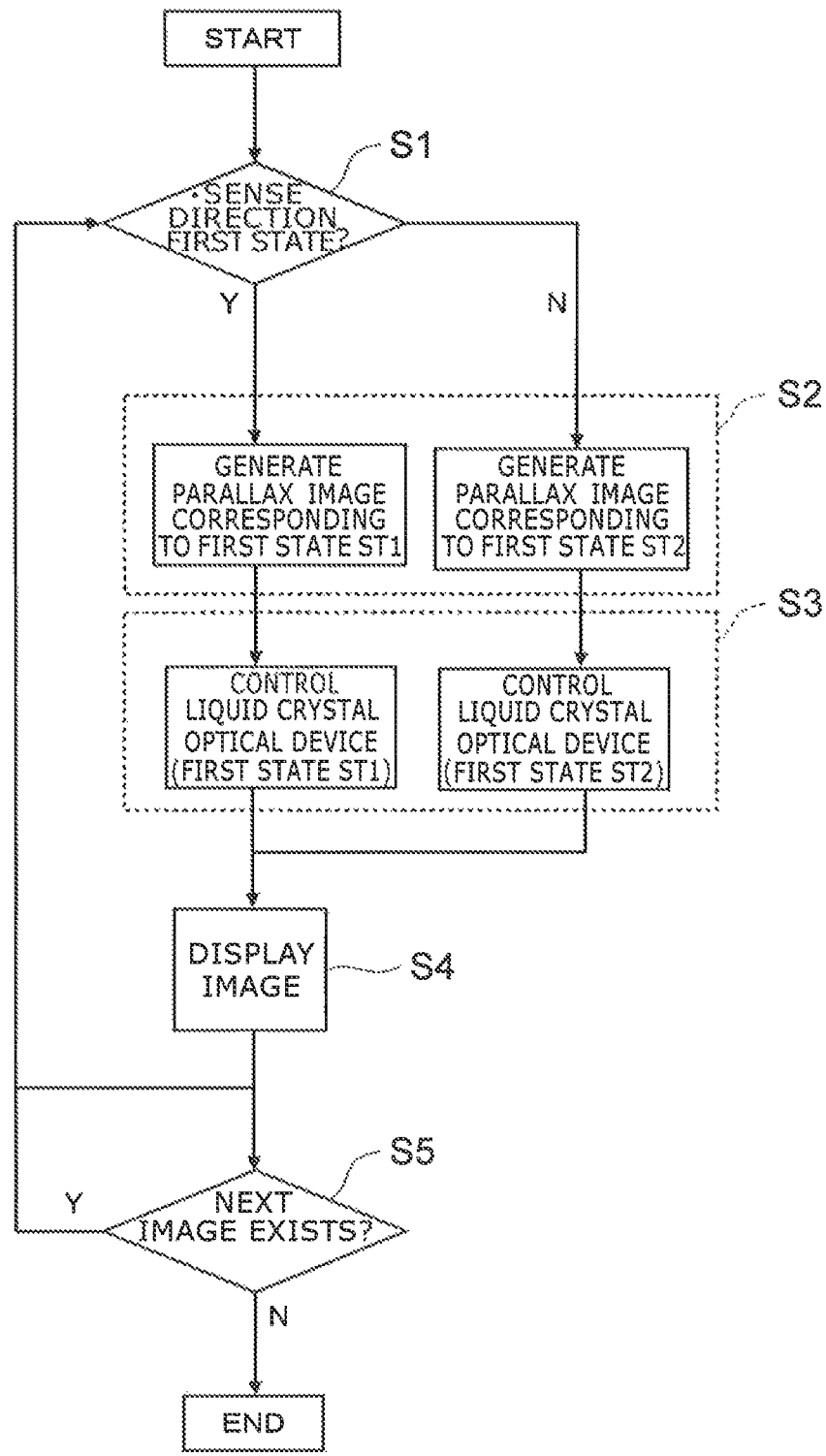
FIG. 18 is a schematic view illustrating operations of the image display device according to the sixth embodiment.

FIG. 18 is a schematic view illustrating operations of the image display device according to the sixth embodiment.

As shown in FIG. 18, the operations of the image display device according to the embodiment include step S1 to step S5.

For example, the controller 200 acquires information relating to the viewing direction in which a viewer 350 is estimated to view the image displayer 400. The viewing direction includes, for example, a rotation direction around the Z-axis direction. The light (the image light 400L) that includes the image information is incident on the viewer 350.

The viewing direction is sensed in step S1. For example, a first sensor 310 that senses the viewing direction of the image displayer 400 by the viewer 350 is provided as the sensor 300. For example, the first sensor images the facial portion of the viewer 350 and estimates the orientation of the face of the viewer 350 from the image of the facial portion that is imaged. Then, the first sensor 310 estimates the viewing direction of the image displayer 400 by the viewer 350 from the estimated orientation of the face of the viewer. Then, the first sensor 310 supplies the sensed information relating to the viewing direction to the controller 200.

In step S2, the image data to be displayed by the image displayer 400 is generated based on the information that is sensed. For example, the data of the parallax image corresponding to the first state ST1 or the data of the parallax image corresponding to the second state ST2 is generated.

The liquid crystal optical device 110 is controlled in step S3. For example, the controller 200 causes the first driver 150 to implement at least one of the first operation or the second operation based on the information that is acquired. In other words, the controller 200 causes the first driver 150 to form one of the first state ST1 or the second state ST2. The controller 200 switches between the implementation of the first operation and the implementation of the second operation by the first driver 150.

The image is displayed in step S4. The controller 200 modifies the light (the image light 400L) of the display layer 423 by controlling the second driver 450 based on the data of the image generated in step S2. For example, the second driver 450 causes the display layer 423 to form the image corresponding to the first state ST1. Or, the second driver 450 causes the display layer 423 to form the image corresponding to the second state ST2.

Thereby, in the case where the viewer 350 rotates the image display device 500 to be portrait and landscape, the appropriate three-dimensional image can be provided according to the viewing direction (the rotation) in which the viewer 350 views the image displayer 400. The order of steps S2 to S4 may be interchanged within the extent of the technical feasibility and may be executed simultaneously.

For example, the sensor 300 senses the viewing direction when necessary in the operation of the image display device 500. When a change of the viewing direction occurs in the operation of the image display device 500, the image display device 500 repeats steps S1 to S4. In step S5, the next image to be displayed by the image display device 500 is sensed. When the next image is displayed, for example, the image display device 500 repeats steps S1 to S4. Thereby, the appropriate three-dimensional image can be provided according to the viewing direction.

In step S1, the information relating to the viewing direction in which the viewer 350 is estimated to view the image displayer 400 may be obtained by any method.

For example, as shown in FIG. 1, a second sensor 320 may be provided as the sensor 300. For example, the second sensor 320 senses the direction, with respect to the reference axis of the extension direction, of at least one of a side of the image displayer 400, a side included in the liquid crystal optical device, or a side of the subpixel 401. For example, at least one of gravity or the earth's axis may be used as the reference axis.

Then, the second sensor 320 generates information relating to the viewing direction in which the viewer 350 is estimated to view the image displayer 400 based on the direction (the direction of the side of the subpixel 401 with respect to the reference axis of the extension direction) that is sensed. For example, in many cases, the viewer 350 views the image display device 500 in a state in which both eyes of the viewer 350 intersect (e.g., are orthogonal to) gravity. Therefore, the Information relating to the viewing direction in which the viewer 350 is estimated to view the image displayer 400 can be generated by sensing the direction of a side included in the image display device 500 (i.e., the subpixel 401) when the direction of gravity is used as the reference.

Then, the second sensor 320 supplies the generated information to the controller 200. In such a case as well, the controller 200 causes the first driver 150 to implement at least one of the first operation or the second operation based on the information that is acquired. Then, the controller 200 modifies the light (the image light 400L) of the display layer 423 by controlling the second driver 450 based on the information that is acquired.

For example, at least one of a camera or a distance sensor may be used as the first sensor 310. For example, at least one of a gravitational acceleration sensor or a distance sensor may be used as the second sensor 320.

The first driver 150 may be included in the liquid crystal optical device. The second driver may be included in the image displayer. At least one of the first driver 150 or the second driver 450 may be embedded in the controller 200. The sensor 300 (e.g., the first sensor 310, the second sensor 320, etc.) may be included in the controller 200.

For example, the controller 200 may be included in the liquid crystal optical device. Also, the sensor 300 (e.g., the first sensor 310, the second sensor 320, etc.) may be included in the liquid crystal optical device. For example, the controller 200 acquires information relating to the rotation of the first substrate unit 10*u* around the Z-axis direction (the direction perpendicular to the X-Y plane). The controller 200 causes the first driver 150 to implement at least one of the first operation or the second operation based on the information that is acquired.

Thus, by using the controller 200 and the sensor 300 in the case where the image displayer 400 and the liquid crystal optical device are rotated around the Z-axis or in the case where the viewer 350 rotates the viewing direction of the viewer 350, an appropriate image that matches the rotation can be provided.

For example, the dispersion, the refraction, the reflection, etc., of the light incident on the liquid crystal optical device 110 can be controlled by driving the liquid crystal optical device 110. In other words, the liquid crystal optical device 110 may be used not only as a lens but also as a prism element.

As shown in the examples, the liquid crystal optical device 110 is included in an image display device (e.g., a stereoscopic display) with, for example, an image displayer. The liquid crystal optical device 110 may be included in a multi-screen display or a directional display. The multi-screen display is, for example, a display in which different images are displayed according to the direction in which the viewer views the display.

The directional display is, for example, a display in which the image that is displayed can be viewed only from some arbitrary direction. For example, the image can be viewed when the display is disposed in front of the viewer. At this time, for example, the image that is displayed cannot be viewed at a position adjacent to the viewer.

For example, the liquid crystal optical device 110 is used as a prism element. The liquid crystal optical device 110 is driven so that the light that is incident on the liquid crystal optical device 110 is emitted toward some arbitrary direction. Thereby, the directional display can be obtained.

The liquid crystal optical device 110 may be used not only with the image displayer but also, for example, as a single optical device in another application. For example, the liquid crystal optical device 110 may be utilized as a switching lens element, a switching prism element, or a phase modulation element.

For example, the liquid crystal optical device 110 is provided at the front surface of the display layer 423. In other words, the liquid crystal optical device 110 is disposed between the display layer 423 and the viewer 350. In the case where a backlight is provided in the image display device, the display layer is disposed between the backlight and the liquid crystal optical device 110.

For example, the liquid crystal optical device 110 according to the embodiment may be provided at the back surface of the display layer 423. In other words, the display layer 423 may be disposed between the liquid crystal optical device 110 and the viewer 350. In the case where the backlight is provided in the image display device, the liquid crystal optical device 110 is disposed between the backlight and the display layer 423. In such a case, the liquid crystal optical device 110 may control, for example, the directivity of the light emitted from the backlight. Thereby, for example, a stereoscopic display, a directional display, a multi-screen display, etc., can be obtained.

According to the embodiments, an image display device that provides a high-quality display can be provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, embodiments of the invention are described with reference to specific examples. However, the embodiments of the invention are not limited to these specific examples. For example, one skilled in the art may similarly practice the invention by appropriately selecting specific configurations of components such as the first substrate, the first electrode, the first substrate unit, the second substrate, the second electrode, the second substrate unit, the liquid crystal layer, the first driver, the liquid crystal optical device, the subpixel, the image displayer, etc., from known art; and such practice is within the scope of the invention to the extent that similar effects are obtained.

Further, any two or more components of the specific examples may be combined within the extent of technical feasibility and are included in the scope of the invention to the extent that the purport of the invention is included.

Moreover, all image display devices practicable by an appropriate design modification by one skilled in the art based on the image display devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An image display device, comprising:
    a liquid crystal optical device that includes:
        a plurality of first electrodes extending in a first direction in a plane,
        a plurality of second electrodes extending in a second direction in the plane, the second direction being different from the first direction,
        a liquid crystal layer provided between the first electrodes and the second electrodes, and a first driver electrically connected to the first electrodes and the second electrodes, wherein the first driver implements forming a first refractive index distribution in the liquid crystal layer along a first perpendicular direction by setting the first electrodes to a first potential, the first perpendicular direction being parallel to the plane and perpendicular to the first direction, and forming a second refractive index distribution in the liquid crystal layer along a second perpendicular direction by setting the second electrodes to a second potential, the second perpendicular direction being parallel to the plane and perpendicular to the second direction; and an image displayer that includes a plurality of subpixels, light from the subpixels being incident on the liquid crystal layer, the light including image information, wherein each of the subpixels has a first length along a third direction and a second length along a fourth direction when projected onto the plane, the third direction is parallel to the plane and different from the first direction and the second direction, the fourth direction is parallel to the plane and perpendicular to the third direction, the first length is shorter than the second length, most proximal electrodes of the first electrodes include a first most proximal electrode and a second most proximal electrode, most proximal electrodes of the second electrodes include a third most proximal electrode and a fourth most proximal electrode, and a first distance along the third direction between a first center in the first perpendicular direction of the first most proximal electrode and a second center in the first perpendicular direction of the second most proximal electrode is shorter than a second distance along the fourth direction between a third center in the second perpendicular direction of the third most proximal electrode and a fourth center in the second perpendicular direction of the fourth most proximal electrode.

2. The device according to claim 1, wherein the image displayer has a display surface having a first side parallel to the fourth direction.

3. The device according to claim 1, wherein the liquid crystal layer in a state of the forming the first refractive index distribution includes a first region between the first most proximal electrode and the second most proximal electrode when projected onto the plane, the image displayer in the forming the first refractive index distribution causes light including information of a first parallax image having a first parallax number to be incident on the first region, the liquid crystal layer in a state of the forming the second refractive index distribution includes a second region between the third most proximal electrode and the fourth most proximal electrode when projected onto the plane, and the image displayer in the forming the second refractive index distribution causes light including information of a second parallax image having a second parallax number to be incident on the second region, wherein the second parallax number is larger than the first parallax number.

4. The device according to claim 3, wherein a value of the first distance divided by the first parallax number is less than a value of the second distance divided by the second parallax number.

5. The device according to claim 3, wherein the second parallax number is 2.

6. The device according to claim 3, wherein $\theta_1$, $\theta_2$, $P_1$, $P_2$, $w_{ap1}$, $w_{ap2}$, $N_1$, and $N_2$ satisfy the relationship $$\frac{N_1(w_{ap1} + w_{ap2} \times \tan\theta_1)}{2 \times P_1} \geq \frac{N_2(w_{ap2} + w_{ap1} \times \tan\theta_2)}{2 \times P_2}$$

where the first angle $\theta_1$ is an angle in a first rotation direction to the first direction from a direction of the fourth direction projected onto the plane, the second angle $\theta_2$ is an angle in the first rotation direction to the second direction from a direction of the third direction projected onto the plane, the first distance is $P_1$, the second distance is $P_2$, the first length is $w_{ap1}$, the second length is $w_{ap2}$, the first parallax number is $N_1$, and the second parallax number is $N_2$.

7. The device according to claim 6, wherein the first angle is larger than the second angle.

8. The device according to claim 7, wherein the first angle is greater than 0 degrees and less than 90 degrees, and the second angle is greater than 0 degrees and less than 90 degrees.

9. The device according to claim 1, wherein a distance between the image displayer and a focal point of the first refractive index distribution is longer than a distance between the image displayer and a focal point of the second refractive index distribution.

10. The device according to claim 1, wherein the liquid crystal layer in a state of the forming the first refractive index distribution includes a first portion along the first direction, the first portion being light-shielding to visible light, and the liquid crystal layer in a state of the forming the second refractive index distribution includes a second portion along the second direction, the second portion being light-shielding to visible light.

11. The device according to claim 1, wherein the liquid crystal layer includes a plurality of liquid crystal molecules, and a fifth direction is positioned inside the obtuse angle between the first direction and the second direction, the fifth direction being a long-axis direction of the liquid crystal molecules projected onto the plane.

12. The device according to claim 1, wherein the liquid crystal optical device further includes a first substrate-side sub electrode provided between the first most proximal electrode and the second most proximal electrode, the first driver sets a potential of the first substrate-side sub electrode to be different from the first potential in the forming the first refractive index distribution, the liquid crystal optical device further includes a second substrate-side sub electrode provided between the third most proximal electrode and the fourth most proximal electrode, and the first driver sets a potential of the second substrate-side sub electrode to be different from the second potential in the forming the first refractive index distribution.

13. The device according to claim 1, wherein
the subpixels includes:
- a first adjacent pixel;
- a second adjacent pixel adjacent to the first adjacent pixel in the third direction, and
- a third adjacent pixel adjacent to the first adjacent pixel in the fourth direction, and
- a distance between a first centroid of the first adjacent pixel projected onto the plane and a second centroid of the second adjacent pixel projected onto the plane is shorter than a distance between the first centroid and a third centroid of the third adjacent pixel projected onto the plane.

14. The device according to claim 1, further comprising a controller, wherein
- the controller acquires information relating to a rotation of the liquid crystal optical device around a direction perpendicular to the plane, and
- the controller switches, based on the acquired information, between the implementation of the forming the first refractive index distribution by the first driver and the implementation of the forming the second refractive index distribution by the first driver.

15. The device according to claim 1, further comprising a controller, wherein
- the controller acquires information relating to a viewing direction of a viewer,
- the controller switches, based on the acquired information, between the forming the first refractive index distribution by the first driver and the forming the second refractive index distribution by the first driver, and
- the viewing direction is estimated to view the image displayer when the light including the image information is incident on the viewer.

16. The device according to claim 15, further comprising a first sensor that senses the viewing direction and supplies information relating to the sensed viewing direction to the controller.

17. The device according to claim 15, wherein
- the image displayer includes a display layer and a second driver,
- the display layer forms the light including the image information,
- the second driver is connected to the display layer, and
- the controller controls the second driver and modifies the light of the display layer based on the acquired information.

18. An image display device, comprising:
a liquid crystal optical device that includes:
- a plurality of first electrodes extending in a first direction in a plane, the first electrodes including a first group of electrodes and a second group of electrodes, the first group of electrodes being selected in a first period, the second group of electrodes being selected in a second period different from the first period,
- an opposing electrode,
- a liquid crystal layer provided between the first electrodes and the second electrodes, and
- a first driver electrically connected to the first electrodes and the opposing electrode, wherein the first driver implements
    - forming a first refractive index distribution in the liquid crystal layer along a first perpendicular direction by setting the first group of electrodes to a first potential, the first perpendicular direction being parallel to the plane and perpendicular to the first direction, and
    - forming a second refractive index distribution along the first perpendicular direction by setting the second group of electrodes to a second potential; and an image displayer that includes a plurality of subpixels, light from the subpixels being incident on the liquid crystal layer, the light including image information,
each of the subpixels has a first length along a third direction and a second length along a fourth direction when projected onto the first surface, the third direction is parallel to the plane and different from the first direction, the fourth direction is parallel to the plane and perpendicular to the third direction,
the first length is shorter than the second length, and
the first period is longer than the second period.

19. The device according to claim 18, wherein a first angle in a first rotation direction to the first direction from a direction of the fourth direction projected onto the plane is not less than 35 degrees and not more than 55 degrees.

* * * * *